(12) United States Patent
Okita et al.

(10) Patent No.: US 6,869,222 B1
(45) Date of Patent: Mar. 22, 2005

(54) ROLLING BEARING

(75) Inventors: Shigeru Okita, Yokohama (JP); Kazuo Sekino, Ashigara-kami-gun (JP); Toyohisa Yamamoto, Fujisawa (JP); Susumu Tanaka, Yokohama (JP); Hiroyuki Ito, Chigasaki (JP); Akira Uchida, Ashigara-kami-gun (JP); Kazuhiro Fujiu, Yokohama (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/719,948

(22) PCT Filed: May 9, 2000

(86) PCT No.: PCT/JP00/02961

§ 371 (c)(1),
(2), (4) Date: Dec. 19, 2000

(87) PCT Pub. No.: WO00/68587

PCT Pub. Date: Nov. 16, 2000

(30) Foreign Application Priority Data

| May 10, 1999 | (JP) | 11-128941 |
| Jun. 8, 1999 | (JP) | 11-161256 |
| Jul. 19, 1999 | (JP) | 11-204647 |
| Sep. 17, 1999 | (JP) | 11-264168 |
| Jan. 31, 2000 | (JP) | 2000-022274 |
| Jan. 31, 2000 | (JP) | 2000-022570 |
| Feb. 22, 2000 | (JP) | 2000-044854 |
| Apr. 6, 2000 | (JP) | 2000-105323 |

(51) Int. Cl.$^7$ ............... F16C 19/00; F16C 33/58
(52) U.S. Cl. ............... 384/462; 384/516; 384/470
(58) Field of Search ................ 384/516, 513, 384/912, 913, 907.1, 492, 462, 523, 527, 531, 526, 530, 532, 470, 908, 569, 450, 491, 565

(56) References Cited

U.S. PATENT DOCUMENTS

| 5,199,799 A | | 4/1993 | Masuda et al. ............ 384/470 |
| 5,273,413 A | * | 12/1993 | Wallin ...................... 384/516 |
| 5,409,359 A | * | 4/1995 | Takano et al. ............ 384/516 |
| 5,411,336 A | * | 5/1995 | Takemura et al. ......... 384/492 |
| 5,516,214 A | | 5/1996 | Kakumoto et al. ........ 384/492 |
| 5,655,844 A | * | 8/1997 | Takano ..................... 384/453 |
| 5,845,997 A | * | 12/1998 | Kinno et al. ............... 384/463 |
| 5,998,042 A | * | 12/1999 | Tanaka et al. ............. 384/490 |
| 6,164,831 A | * | 12/2000 | Matsui et al. ............. 384/469 |

FOREIGN PATENT DOCUMENTS

| DE | 44 46 088 | | 6/1995 |
| EP | 0 486 218 | | 5/1992 |
| JP | 61-215811 | | 9/1986 |
| JP | 361203057 A | * | 9/1986 |
| JP | 4-181018 | | 6/1992 |

(List continued on next page.)

Primary Examiner—Xuan Lan Nguyen
(74) Attorney, Agent, or Firm—Crowell & Moring LLP

(57) ABSTRACT

A full complement angular ball bearing with no cage and having a contact angle from 10 to 45° and an increased number of balls for use under severe conditions. The life is extended by defining the surface roughness of the inner ring and the outer ring, defining the roughness ratio of them relative to the rolling element, defining the Cr content in the alloy steel for the rolling element, forming the rolling element with oxide ceramics, or providing a dense nitride layer on the surface of the rolling element, avoiding the presence of particles with a mean diameter in excess of 3 μm on the raceway surfaces of the outer ring and the inner ring, or coating a film of a hardness higher than that of the raceway surface of the outer ring and the inner ring on the surface of the rolling element.

9 Claims, 13 Drawing Sheets

FOREIGN PATENT DOCUMENTS

| | | |
|---|---|---|
| JP | 6-165790 | 6/1994 |
| JP | 6-54921 | 7/1994 |
| JP | 7-63222 | 3/1995 |
| JP | 7-190067 | 7/1995 |
| JP | 7-208481 | 8/1995 |
| JP | 7-217659 | 8/1995 |
| JP | 9-229072 | 9/1997 |
| JP | 10-103356 | 4/1998 |
| JP | 10-196658 | 7/1998 |
| JP | 11-62990 | 3/1999 |
| JP | 11-80923 | 3/1999 |
| JP | 11-101250 | 4/1999 |

* cited by examiner

ROLLING BEARING

TECHNICAL FIELD

The present invention relates to a rolling bearing which is used in a reduced pressure atmosphere such as in semiconductor production apparatus or vacuum pump apparatus, used in a high temperature circumstance such as in heat rolls for fixing portions of business machines, or used in an atmosphere containing lubricating oil or greases containing fluoro-containing polymers, or containing gases comprising fluorides.

BACKGROUND ART

Vacuum pumps for creating or maintaining vacuum include various types, in which a dry screw pump can be mentioned as those providing relatively low vacuum degree. This comprises a pump main body having a suction port and a discharge port, a pair of rotors disposed in the pump main body and formed with left hand screws and right hand screws, respectively, and a rotor shaft rotationally held by means of rolling bearings in the pump main body, in which the pair of rotors rotate in synchronization in a state not in contact with each other, thereby sucking a gas in a vessel connected with the suction port into the pump main body and discharging the same from the discharge port to evacuate the inside of the vessel.

The two rotor shafts are rotationally supported by rolling bearings and usual bearing steels (SUJ2) are often used for the rolling bearings. Since high contact stresses are exerted repeatedly on inner and outer rings and rolling elements of the rolling bearing, it is necessary to harden the inner and outer rings and the rolling elements for extending the rolling contact fatigue life. Accordingly, after forming the inner and the outer rings and the rolling elements of the rolling bearing with the bearing steels (SUJ2), quenching and tempering are applied.

Further, as lubricants for bearings used in reduced pressure (including vacuum) atmosphere such as in vacuum pump apparatus, solid lubricants are sometimes used for preventing contamination of the reduced pressure atmosphere and the use of fluid lubricants such as lubricating oil has been increased in order to improve the life and the reliability of the bearings. As typical examples, highly corrosion resistance and less evaporative fluoro-lubricating oil are used. Particularly, in high vacuum pumps used at a high speed rotation and in a high temperature circumstance depending on the case, fluoro-lubricating oil with higher reliability have been used more frequently. Heretofore, in the rolling bearings used in such a reduced pressure atmosphere including vacuum, only the lubricant is changed to the fluoro-lubricating oil but the accuracy of the bearings per se is left as it is in the usual specification (for instance, at about JIS B 1514 for the accuracy).

On the other hand, fluoro-lubricating oil or fluoro-grease which is excellent in heat resistance, less evaporative and chemically stable is used also in a high temperature circumstance exceeding 200° C. such as in heat rolls for fixing portions of business machines. Such fluoro-lubricating oil or fluoro-grease can include, for example, lubricating oil or greases containing fluoro-containing polymers such as perfluoropolyether (PFPE) oil or fluoro-grease using the PFPE oil as a base oil. Under the usual working circumstances, there has been no problem for the lubrication with the lubricating oil or greases containing such fluoro-containing polymers.

However, business machines typically represented by copying machines (PPC), laser beam printers (LBP), facsimile (FAX) or composite machines thereof have tended to be adapted for more compact structure, energy saving, recycling performance and higher speed in recent years and, accordingly, it has been demanded for longer torque life with a smaller size and under severer conditions (high speed and heavy load). Further, also in the field of the vacuum pump, rolling bearings capable of operating for a long time at higher temperature and under higher speed have been demanded in order to increase the capacity and make the structure compact. Further, also in the field for manufacturing semiconductors and liquid crystal panels, operation for long time under large load and high speed is required for the rolling bearings to be used along with the enlargement for the size and high speed transportation of substrates.

Aside from them, as general materials for cages that hold rolling elements in an even distribution between an outer ring raceway and an inner ring raceway, SPCC material, $HB_{25}CL$ material and PA66 resin material have been used. For the rolling bearings required for corrosion resistance such as support bearings in the vacuum pumps, cages for use in rolling bearings formed into a circular shape with a advanced resin material which is poor in the ductility but has corrosion resistance is used. In the cage for use in the rolling bearing, a plurality of pockets each receiving a rolling element from an opening and holding the same rotatably are disposed each at a predetermined distance in the circumferential direction.

Referring to FIG. 24, size F for the opening of each pocket 30 is set to a value of 85 to 93% for the rolling element diameter G. Accordingly, each rolling element 31 is assembled from the opening 33 into each pocket 30 while circumferentially expanding fingers 32 of each pocket 30. This can make easy assembling of the rolling element 31 to each pocket 30 and less drop off of the rolling element 31 assembled in each pocket 30 compatible.

DISCLOSURE OF THE INVENTION

By the way, in the rolling bearing for use in the vacuum pump used at a high speed rotation and, depending on the case, in a high temperature circumstance, since lubrication in an oil bath is not possible and it adopts a splashing lubrication system using a gear or the like in view of lowering of lubricant membranes due to the temperature elevation of the lubricating oil or in order to prevent contamination of the pump portion with the lubricating oil, there is a worry of insufficiency for lubricating conditions such that the supply of the lubricating oil tends to become insufficient. Further, since the fluoro-lubricating oil has higher specific gravity and so-called wettability is deteriorated extremely compared with usual mineral lubricating oil, formation of the lubricant membranes tends to be difficult, which makes the lubricating conditions severer. Further, upon starting discharge of atmospheric air, excess axial load is applied, although in a short period of time, on the bearing supporting the rotor of the dry screw pump and axial load fluctuation is caused to the bearing. When such severe lubricating conditions are applied together to make the lubrication insufficient, it may be a worry of causing peeling wear or peeling flaking to the raceway surface of the bearing.

Further, when the oil bath lubrication with the fluoro-lubricating oil is adopted, the height of the oil surface (height of the oil surface from the lower side of the inner diametrical surface of a housing to the pitch circle diameter of the bearing) is not sufficient in view of the structure of the apparatus to sometimes make the lubrication unfavorable. That is, in duplex angular ball bearings or double row angular ball bearings as shown in FIG. 20 to FIG. 23, although the lubrication near the oil surface is favorable, the portion opposite to the oil surface is lubricated by the rotation of the bearings, so that the lubrication state is not satisfactory, and wear between each of the cage, the rolling ring and the rolling element is promoted to sometimes lead to the fracture of the cage, discoloration of the rolling elements and, thus, fracture of the bearing.

In the drawings, an outer ring 100, an inner ring 200, a rolling element 300 and a cage 400 are shown.

Further, the fluoro-lubricating oil reacts with iron to form iron fluorides, which decompose, as a catalyst, the fluoro-lubricating oil. As described above, when the lubrication is insufficient, and the rolling element and the raceway surface of the bearing ring are in direct contact with each other, the contact point is locally heated to an extremely high temperature, which decomposes the fluoro-lubricating oil (PFPE oil and the like) sometimes to erode the surfaces of the rolling element, the bearing ring and the cage to shorten the life. In order to cope with such problems, silicon nitride ($Si_3N_4$) has been used for rolling elements in view of the merit that it is excellent in adhesion resistance and scorch resistance with metals and light in weight in a high speed application used such as in machine tools or vacuum pump apparatus. However, when temperature is locally raised by oil membrane breakage or the like, it causes another problem that the PFPE oil reacts with Si as the main ingredient of silicon nitride and, as a result, $Si_2F_6$ gas is evolved to embrittle the material and result in abnormal wear.

Such problems, may possibly occur quite in the same manner also in rolling bearings used, for example, in an atmosphere containing a gas comprising fluorides, in addition to the lubricating conditions with lubricating oil or grease containing a fluoro-containing polymer.

Further, aside from them, there is another problem in the existent cage for use in rolling bearings. When a resin material with less deformability than the polyamide resin, for example, a advanced resin such as polyphenylene sulfide (PPS) resin is used as the material, the force exerted to push-open fingers 32 of a pocket 30 upon assembling a rolling element 31 from an opening 33 to the pocket 30 (refer to FIG. 24) forms a bending moment on the entire cage to possibly cause cracks or breakages to a portion at the bottom of the pocket 30 of a reduced thickness (with less strength), concretely, in the bottom of the pocket 30 having a weld line 34. Particularly, for an axial load, when weld lines are formed at the bottom of the pockets by uneven numbers, they tend to form initiation points for the occurrence of cracks.

The present invention has been developed for overcoming the problems described above and it is an object thereof to provide a rolling bearing of longer life even under severe lubricating conditions due to fluoro-lubricating oil and provides a rolling bearing free from occurrence of cracks or breakage to pockets having weld lines upon assembling a rolling element to the pocket of a cage.

The present inventors have made investigations on the form of peeling wear or peeling flaking occurring in rolling bearings lubricated with a fluoro-lubricating oil and have recognized the following features.

a. Rolling elements of rolling bearings in which peeling has occurred to inner rings or outer rings are always worn.

b. In raceway surfaces of inner and outer rings and the rolling elements in which peeling has occurred, tracks formed by biting of obstacles such as wear particles and abrasive wears due to obstacles are observed.

c. Even when peeling does not occur to the inner rings or the outer rings, it is sometimes observed that the rolling elements are damaged or worn.

d. Abnormal wear occurs in the pocket portion of the steel cage in a bearing in which the rolling elements are damaged or worn.

From the forgoing results, it is easily supposed that occurrence of peeling starts at first from the rolling element. Then, the mechanism is supposed as follows, 1. In bearings for use in a vacuum pump lubricated with a fluoro-lubricating oil and further used under a high rotation, lubricating conditions are extremely severe. That is, since the fluoro-lubricating oil has poor wettability, the lubricating oil less prevails in gaps and, further, the temperature is elevated at high rotation, the lubricating performance, particularly, around the cage is deteriorated. Accordingly, the rolling element and the cage are sometimes brought into an intimate contact with each other.

2. When the lubrication for the cage is insufficient, the pocket portion of the cage is sometimes worn by the contact with the rolling element, or the rolling element itself is damaged to worsen the surface roughness.

3. The rolling element deteriorated for the roughness under the severe lubricating condition is in metal contact with the inner ring and the outer ring to cause peeling to the inner ring and the outer ring. Further, peeling in the rolling element or the inner ring and the outer ring is promoted due to the abraded powder of the cage.

In view of the above, a rolling bearing according to claim 1 of the present invention comprises at least an outer ring having an outer ring raceway, an inner ring having an inner ring raceway and rolling elements rotatably disposed between the outer ring raceway and the inner ring raceway, and selectively has a cage for evenly distributing the rolling elements in the rotational direction of the rolling elements, and is used under lubrication with a lubricating oil or a grease containing a fluoro-containing polymer, or in an atmosphere containing gases comprising fluorides, and features in that the bearing comprises full type angular ball bearing with a contact angle being 10° or more and 45° or less.

Further, a rolling bearing according to claim 2 of the present invention as defined in claim 1 has the contact angle of 15° or more and 30° or less.

By adopting the full type angular ball bearing, since the number of balls is about twice as much as, usual deep groove ball bearing, the contact pressure between the inner and outer rings and the balls can be kept lower and the wear can be reduced. Further, since the angular type ball bearing has a contact angle, the degree of spin sliding due to fluctuating load is reduced to decrease the wear compared with the deep groove ball bearing. The contact angle is preferably from 10 to 45° and further preferably from 15 to 30°. If the contact angle is less than 10°, the load capacity is small, and it is fragile to the fluctuating load. On the other hand, if it exceeds 45°, spin sliding increases to increase wear. Further, by the use of ceramics for the rolling element, hardness of the rolling element is increased and the wear of the rolling element can be decreased.

Further, as a result of investigation conducted by the present inventors for the effect of roughness under the lubricating condition with the fluoro-lubricating oil, there appear phenomena that (a) the rolling element is worn as the roughness of the inner ring and the outer ring is worsened, and (b) the rolling element is worn along with increase of the ratio between the roughness of the inner ring and the outer ring and the roughness of the rolling element.

This is because metal contact is caused when the roughness is worsened under the severe lubricating condition with the fluoro-lubricating oil to additionally worsen the roughness or cause contact wear, tending to cause peeling wear.

Further, when a worn rolling element is observed closely, it has been confirmed the presence of a number of scratch damages caused by fine obstacles (at µm level). This is considered to be attributable to the abrasive wear caused by fine abraded powder formed by metal contact or contact wear, and the wear particles are increased as the roughness of the inner ring and the outer ring is worsened, tending to increase the wear of the rolling element.

Then, the bearing for use in the vacuum pump used in high temperature high speed circumstance is applied with a dimensional stabilization such that the bearing does not suffer from dimensional aging change by temperature. The dimensional stabilization is a heat treatment to a bearing applied previously at a temperature higher than the working temperature of the bearing and it is generally a treatment conducted in the tempering step. However, since the tempering for the bearing material progresses depending on the treating temperature, softening phenomenon due to tempering occurs depending on the treating temperature. That is, when the dimensional stabilization is conducted relative to usual tempering, the hardness of the bearing tends to be lowered.

Further, since elongation or toughness of the bearing material is improved due to lowering of the hardness, to give viscosity to the material, it causes difficulty in finishing to the grinding process for the bearing tending to worsen the surface roughness of the bearing raceway surface.

Accordingly, it has been confirmed a trend that wear tends to occur in the bearing of such a high temperature specification due to worsening of the roughness under the severe lubricating condition by the fluoro-lubricating oil.

In view of the above, a rolling bearing according to claim 3 of the present invention has a feature in the invention defined in claim 1 or 2, wherein the surface roughness of the outer ring and the inner ring is 0.05 µm Ra or less and the ratio of the surface roughness of the outer ring and the inner ring relative to the surface roughness of the rolling element is 6 or less. The ratio K for the surface roughness of the inner ring or the outer ring relative to the surface roughness of the rolling element is expressed as follows $$K = (\text{surface roughness of inner ring or outer ring } (Ra))/(\text{surface roughness of rolling element}(Ra))$$

Critical meanings are to be described below.

(Surface Roughness of Inner Ring and Outer Ring of 0.05 µm or Less)

As described above, it has been confirmed the phenomena that the rolling element is worn under the lubricating condition with the fluoro-lubricating oil when the roughness of the inner ring and the outer ring is worsened. FIG. 2 shows a relation between the roughness of the inner ring or the outer ring and the life. When the roughness of the inner ring or the outer ring exceeds 0.05 µm Ra, the life is lowered remarkably. Further, since stable life is obtained if it is 0.04 µm Ra or less, it is desirably 0.04 µm Ra or less. Further, improvement of the U roughness is favorable in view of the life but it is rather difficult to reduce Ra to less than 0.01 µm in usual bearing manufacturing steps in view of the performance of the fabrication step and the time of fabrication and, since this extremely increases the fabrication cost, the roughness of the inner ring and the outer ring is desirably 0.01 m Ra or more.

(Ratio of the Surface Roughness of Inner Ring or Outer Ring Relative to the Surface Roughness of Rolling Roughness of 6 or Less)

As the roughness of the inner ring and the outer ring is worsened, metal contact or contact wear tends to occur and it is known that the surface roughness of the mating member also has a concern with such contact wear (refer to Japanese Published Unexamined Patent Application Hei 6-50344). Similar phenomenon appears also under the lubricating condition with the fluoro-lubricating oil and, when the roughness of the rolling element is excessively improved, wear occurs in the rolling element even when the roughness of the inner ring or the outer ring is 0.05 µm or less.

FIG. 3 shows a relation between the ratio of the surface roughness of the inner ring and the outer ring relative to the surface roughness of the rolling element (hereinafter simply referred to also as a roughness ratio) and life. If the roughness ratio exceeds 6, the life is lowered remarkably. Also, since the stable life is obtained if the roughness ratio is 5 or less, the roughness ratio is desirably 5 or less. Further, while the decrease of the roughness ratio is favorable in view of the life, the roughness of the rolling element, particularly, when it is a ball, is inherently better compared with the inner ring or the outer ring and it is necessary to extremely improve the roughness of the inner ring and the outer ring in order to decrease the roughness ratio. However, since no significant improvement for the roughness can be expected in usual bearing manufacturing steps and, on the other hand, if the roughness ratio is decreased by worsening the roughness of the ball, it in turns lowers the acoustic level of the bearing, so that the roughness ratio is desirably 3 or more taking the fabrication cost and the acoustic level into consideration.

Further, the rolling bearing according to claim 4 of the present invention defined in the inventions of claims 1 to 3 has a feature in that at least the rolling element is formed of an alloy steel with a Cr content of 7% by weight or more and 27% by weight or less, and fine carbides are uniformly dispersed on the surface.

An alloy steel containing a great amount of Cr forms a dense and stable oxide layer (passivated state) on the surface and forms $M_7C_3$ type or $M_{23}C_6$ type carbide which is hard and of slow grain growing rate (small grain size). According to the rolling bearing, since the oxide layer and the carbide are present at least on the surface of the rolling element, even when the thickness of the lubricating membrane is reduced to cause a direct contact between the rolling surface of the rolling element and the raceway surface of the bearing ring, occurrence of adhesive wear can be prevented. Further, even when the contact point between the rolling element and the bearing ring is locally heated to an extremely high temperature, corrosion due to the fluoro-lubricating oil or fluoride gas on the surface of the rolling element and the bearing ring can be suppressed.

For attaining the effect described above, it is necessary to increase the Cr content in the alloy steel used to 7% by weight or more. However, if the Cr content in the alloy steel used exceeds 27% by weight, macro Cr carbides are formed in the stage of the raw material and stress concentration is undesirably caused at the periphery thereof. Further, since Cr is an expensive element, it results in increased cost when contained by a great amount.

In the rolling bearing, a preferred range of the Cr content in the alloy steel forming at least the rolling element is 7% by weight or more and 25% by weight or less, and a more preferable range is from 7% by weight or more to 22% by weight or less, and a further preferred range is 10% by weight or more and 22% by weight or less. Further, it is preferred that the alloy steel forming at least the rolling element has a Si content from 7% by weight or more to 27% by weight or less and Sr content is from 0.10% by weight or more and 1.5% by weight or less.

Si has to be contained by 0.10% by weight or more as a deoxidizer upon steel making. Further, Si is an effective element for the improvement of the rolling cntact fatigue life but it is also an element of reacting with a fluoro containing polymer or a fluoride in a high temperature circumstance to form a silicon fluoride ($Si_2F_6$) gas. The gas is formed by the reaction of a fluoro containing polymer contained in the lubricant or a fluoride in the atmospheric gas and Si in the alloy steel forming the rolling element and the bearing ring in a case, for example, when the temperature at the contact point between the rolling element and the bearing ring is locally heated to an extremely high temperature. Accordingly, when the gas is formed, the raceway surface of the rolling element and the raceway surface of the bearing ring is embrittled, to cause wear between the raceway surface of the rolling element and the raceway surface of the bearing ring. In order to prevent formation of the silicon fluoride gas so as not to cause such wear, it is preferred to reduce the silicon content in the alloy steel to 1.5% by weight or less and, more preferably, 1.0% by weight or less, and, further preferably, 0.8% by weigh or less.

In this rolling bearing, it is desired that the alloy steel at least forming the rolling element has a Cr content of from 7% by weight or more and 27% by weight or less, the Si content of from 0.10% by weight or more and 1.5% by weight or less and the N content of from 0.05% or less and less than 0.20% by weight.

When N is contained in the alloy steel, martensite formed by quenching is strengthened to improve pit corrosion resistance. Accordingly, use of the N-containing alloy steel can prevent corrosion due to the fluoro-lubricating oil fluoride gas to the surface of the rolling element and the bearing ring in a case where the temperature at the contact point between the rolling element and the bearing ring is heated locally to an extremely higher temperature. Further, when N is contained in the alloy steel, since formation of macro Cr carbides is suppressed, early flaking caused by stress concentration can be prevented.

In order to attain such an effect, the N content in the alloy steel used has to be 0.05% by weight or more. However, for incorporating N by 0.20% by weight or more in the alloy steel, steel making has to be conducted in a high pressure N atmosphere, which increases the cost by so much as the cost for the production facility and maintenance. When N is intended to be contained by 0.20% by weight or more by steel making in an atmospheric pressure, bubbles are formed in the solidification process to include a great amount of pores in ingots, or a great amount of residual austenite is formed upon quenching to possibly lower the quenching hardness. In order to avoid them, the N content in the alloy steel used is preferably less than 0.20% by weight. More preferred N content is from 0.05% by weight or more and 0.19% by weight or less and a further preferred N content is from 0.08% by weight or more and 0.19% by weight or less.

In the rolling bearing, it is preferred that the alloy steel for at least forming the rolling element contains Mn at a content of 1.5% by weight or less in addition to Cr, Si and N described above. Mn acts as a deoxidizer during steel making. Further, it is also preferred to further contain, for example, Mo for improving the hardenability and V for improving the wear resistance.

Further, in the rolling bearing, it is preferred that at least one of the inner ring, the outer ring and the rolling element has a hardness for the raceway surface or rolling surface of Hv 450 or more. This can prevent permanent strain (dent) due to the plastic deformation forming at the contact point between the raceway surface of the bearing ring and the rolling surface of the rolling element, even when a certain load is applied to the rolling bearing. As a result, the rolling cntact fatigue life is not deteriorated remarkably even when a load is applied to some extent.

In the rolling bearing, it may suffice that at least the rolling element is formed of an alloy steel with the Cr content of 7% by weight or more and 27% by weight or less and the inner ring and the outer ring can be formed of a material generally used so far. The material can include, for example, bearing steels such as SUJ2 and NSJ2, and ceramics such as silicon nitride ($Si_3N_4$), silicon carbide (SiC), Sialon, partially stabilized zirconia ($ZrO_2$) and alumina ($Al_2O_3$).

Further, a rolling bearing according to claim 5 of the present invention in the invention defined in claim 1 to 4, has a feature in that at least the rolling element comprises oxide ceramics or has a dense nitride layer on the surface of the rolling element, and the surface roughness of the rolling element is 0.005 μm Ra or less and the surface hardness is Hv 900 or more.

In the rolling bearing, the oxide ceramics may comprise ceramic materials comprising zirconia as the main ingredient or ceramic materials comprising alumina as the main ingredient. In this rolling bearing, since ceramic materials comprising zirconia as the main ingredient or the ceramic material comprising alumina as the main ingredient which are extremely chemically stable oxide series ceramic are used for the surface of the rolling element or the rolling element per se, even if it is locally heated to a high temperature, they scarcely react with the PFPE oil. As a result, it is possible to further decrease the wear and make the life longer.

Further, in the rolling bearing, since the surface of the rolling element is formed of a nitride layer and made harder as HV 900 than the inner ring and the outer ring, peeling can be prevented to mitigate wear and it can be operated at a high rotational speed for a long period of time particularly when used in the vacuum circumstance. Further, since it has a nitride layer on the surface, the decomposition of the fluoro-lubricating oil can be suppressed to improve the lubricity. Further, since the nitride layer is less reactive compared with the copper surface, the corrosive wear on the surface can be reduced.

Further, since the combination of the inner ring and the outer ring, and the rolling element comprises a combination of steel and a nitride layer, wear is less caused compared with the steel-to-steel combination (effect obtained by the combination of different kinds of materials). Since the roughness of the rolling element is excessively poor tending to cause roughened wear if the surface roughness of the rolling element exceeds 0.005 μm Ra, the surface roughness of the rolling element is defined as 0.005 μm Ra or less.

Further, the rolling bearing may be constituted in the same manner as usual rolling bearing excepting that at least the rolling element is different among the inner ring, the outer ring and the rolling element. Accordingly, the materials used for those other than the rolling element can include generally used bearing steels (SUJ2, carburated steel), martensitic stainless steel (SUS 440C, 0.45C-13 Cr-0.13 N martensitic stainless steel), precipitation hardened stainless steel (SUS 630 or the like) and titanium alloy, with no particular restriction to them.

Further, when the indent track of obstacles or mode of wear described above are observed more closely, it was confirmed that identical flaws remain repeatedly. From the result, intrusion of obstacles may be considered as a cause for the occurrence of peeling fracture as described above. That is, it may be supposed a mechanism that obstacles are fixed on the raceway surface of the inner ring and the outer ring and as they damage the rolling element repeatedly, the roughness on the rolling surface of the rolling element is increased and then the peeling fracture occurs on the raceway surface of the inner ring and the outer ring.

In view of the above, a rolling bearing lubricated with a fluoro-lubricating oil was rotated, and the raceway surface of the rolling bearing was observed in a relatively favorable state before occurrence of the peeling fracture. As a result, it was confirmed that similar flaws with those described above were applied repeatedly to the inner ring and the outer ring and to the rolling element also in the initial fatigue state. Then, when the state and the ingredients of the thus fixed obstacles were investigated, they were ceramic ingredients such as alumina as non-metal ingredients.

Further, when the raceway surface of the not yet used rolling bearing lubricated with a fluoro-lubricating oil was also observed, presence of ceramic ingredients or metal obstacles was confirmed although slightly and it was found that there is a possibility that the obstacles are already deposited on the raceway surface upon completion of the rolling bearing. Then, it is considered that such obstacles are due to abrasive grains forming a working grinding wheel used for finishing the raceway surface of rolling bearings by grinding, which remain on the raceway surface.

In view of the above, it has been found that abrasive grains remained slightly on the raceway surface of the rolling bearing in the grinding step bring about the peeling fracture in the rolling bearing lubricated with a fluoro-lubricating oil, to possibly reduce the life of the rolling bearing greatly.

On the other hand, compared with obstacles deposited on the raceway surface of the not-used rolling bearing described above, obstacles deposited on the raceway surface of the rolling bearing in the relatively favorable state before the occurrence of the peeling fracture varied greatly in the frequency to be found and the amount of existence. From the foregoings, it is easily supposed that occurrence of the peeling fracture is not caused merely the obstacles such as abrasive grains remained slightly on the raceway surface of the rolling bearing in the grinding step.

In view of the above, the present inventors have further investigated the invading route of obstacles and confirmed that ceramic ingredients or metal obstacles are present in the fluoro-lubricating oil to be filled in the rolling bearing. It has been supposed that since the fluoro-lubricating oil is relatively expensive compared with usual lubricating oil, it was often used being dispensed in a small amount (about 0.5 to 2 liter) in a container made of a resin, and the fluoro-lubricating oil is possibly contaminated with obstacles present in the container.

Then, the present inventors have found that application of surface treatment such as barrel treatment to the raceway surface of the inner ring and the outer ring is effective for removing obstacles deposited on the raceway surface of the inner ring and the outer ring described above and that filtration of the fluoro-lubricating oil is effective for removing obstacles contained in the fluoro-lubricating oil.

Then, the rolling bearing according to claim 6 of the present invention defined in claim 1 or 2 has a feature in that obstacles with a mean diameter in excess of 3 μm are not present at least on the raceway surface of the outer ring and the inner ring.

The mean diameter means a mean value for the major axis and the minor axis of the obstacles. The life of the rolling bearings is insufficient when obstacles having a mean diameter in excess of 3 μm are present on the raceway surface of the outer ring and the inner ring. Then, if the obstacles are not present or they have a mean diameter of 3 μm or less if present, the rolling bearing has long life.

A method of avoiding the presence of obstacles having a mean diameter in excess of 3 μm on the raceway surface can include a method of applying the surface treatment to the raceway surface. This treatment can remove the obstacles present on the raceway surface. The surface fabrication treatment can include, for example, a barrel treatment or a cloth treatment.

Further, a method of filtering the fluoro-lubricating oil before filling it into gaps of the rolling bearing can be mentioned. Since obstacles in the fluoro-lubricating oil are removed by filtration, obstacles are not supplied from the fluoro-lubricating oil to the surface of the raceway.

One of the surface treatment and the filtration of the fluoro-lubricating oil may be conducted but higher effect can be obtained and a rolling bearing of longer life can be obtained by applying both of them.

Further, bearing steel (SUJ2) is usually used being applied with quenching for the rolling bearing used in vacuum pumps. Hardness of the bearing steel after quenching is Hv 750 to 800.

The rolling bearings for the vacuum pumps tend to be used under high temperature and high speed conditions. Further, in the vacuum pump used, for example, in semiconductor manufacturing apparatus, corrosive gases are sometimes exhausted, so that fluoro-lubricating oil of low reactivity are used for the lubrication of the rolling bearing. As described above, fluoro-lubricating oil has no excellent lubricity and may sometimes cause wear to the bearing rolling surface due to lubrication failure. For preventing the wear, the rolling surface of the bearing can be further hardened to mitigate the wear.

The rolling bearing according to claim 7 of the present invention defined in claim 1 or 2 has a feature in that a layer harder than the raceway surface of the outer ring and the inner ring is coated at least to the surface of the rolling element.

The layer harder than the rolling bearing can include, for example, layers of metals or ceramics such as chromium, electroless nickel, Ni—W, titanium nitride, titanium carbide, chromium nitride, hard carbon and diamond.

Further, as described above, the fluoro-lubricating oil and iron react to form iron fluorides, which further decomposes as a catalyst the fluoro-lubricating oil. On the contrary, when the iron surface of the rolling bearing is coated with other material, decomposition of the fluoro-lubricating oil can be suppressed and prevented to improve the lubricity by so much. Particularly, ceramic coating has an effect for suppressing the decomposition of the fluoro-lubricating oil.

Further, when the inventors of the prevent application conducted a life test under the lubricating condition with a fluoro-lubricating oil using a plastic cage for demonstrating the supposed mechanisms up to the occurrence of peeling, the plastic cage did not damage the rolling element by contact with the rolling element and, since the hardness of the abraded powder is low, it does not damage the inner ring, the outer ring and the rolling element and the long life is obtained. In view of the above, the present inventors have found that combination of the material of the cage and the rolling element has a great effect on the bearing life due to peeling fracture under the lubricating conditions with the fluoro-lubricating oil.

The rolling bearing according to claim 8 of the present invention has a feature of comprising an outer ring having an outer ring raceway, an inner ring having an inner ring raceway, and rolling elements rotatably disposed between the outer ring raceway and the inner ring raceway, and selectively having a cage for evenly distributing the rolling elements in the rotational direction of the rolling elements between the outer ring raceway and the inner ring raceway, and used under lubrication with a lubricating oil or a grease containing a fluoro-containing polymer or in an atmosphere containing a gas comprising fluorides, wherein the cage is formed with a advanced resin material into a circular shape, a plurality of pockets each containing the rolling element through an opening and rotatably holding the same are disposed in plurality at a predetermined distance in the circumferential direction, the size for the opening of the pocket having a weld line has a value of 93% or more of the diameter of the rolling element, and the size for the opening of at least two other pockets is 80% or more and 93% or less of the diameter of the rolling element.

Further, the rolling bearing according to claim 9 of the present invention has a feature of comprising an outer ring having an outer ring raceway, an inner ring having an inner ring raceway, and rolling elements rotatably disposed between the outer ring raceway and the inner ring raceway, and selectively having a cage for evenly distributing the rolling elements in the rotational direction of the rolling elements between the outer ring raceway and the inner ring raceway, and used under lubrication with a lubricating oil or a grease containing a fluoro-containing polymer or in an atmosphere containing a gas comprising fluorides, wherein the cage is constituted with a PTFE resin material or a PPS resin material and/or constituted by applying chamfering to inner and outer diametrical sides of the pockets and forming a through hole in the bottom of each pocket.

The rolling bearing according to claim 10 of the present invention has a feature of comprising an outer ring having an outer ring raceway, an inner ring having an inner ring raceway, and rolling elements rotatably disposed between the outer ring raceway and the inner ring raceway, and selectively having a cage for evenly distributing the rolling elements in the rotational direction of the rolling elements between the outer ring raceway and the inner ring raceway, and used under lubrication with a lubricating oil or a grease containing a fluoro-containing polymer or in an atmosphere containing a gas comprising fluorides, wherein the cage is formed with a advanced resin material into a circular shape, and a plurality of pockets each containing the rolling element through an opening and rotatably holding the same are disposed at a predetermined distance in the circumferential direction, the size for the opening of the pocket having a weld line has a value of 93% or more of the diameter of the rolling element and the size for the opening of at least two other pockets is 80% or more and 93% or less of the diameter of the rolling element, and the cage is constituted with a PTFE resin material or a PPS resin material and/or constituted by applying chamfering to inner and outer diametrical sides of the pockets and forming a through hole in the bottom of each pocket.

As the advanced resin material described above, advanced engineering plastics of excellent corrosion resistance specifically, polyphenylene sulfide (PPS) resin, polyether ether ketone (PEET) resin and polybutylene terephthalate (PBT) resin are used suitably.

BEST MODE FOR PRACTICING THE INVENTION

The mode of practicing the present invention is to be described.

Figure 1:
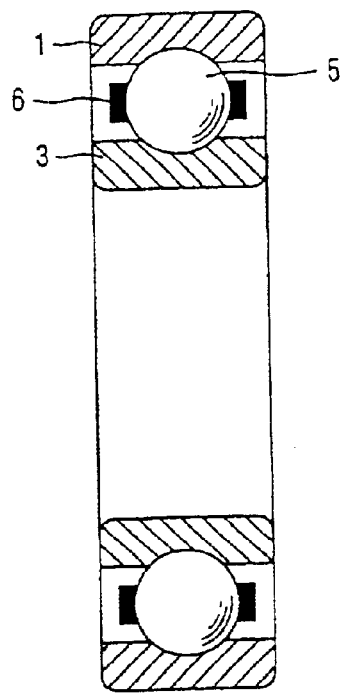
FIG. 1 is a longitudinal cross sectional view illustrating an embodiment of a rolling bearing according to the present invention.
Figure 2:
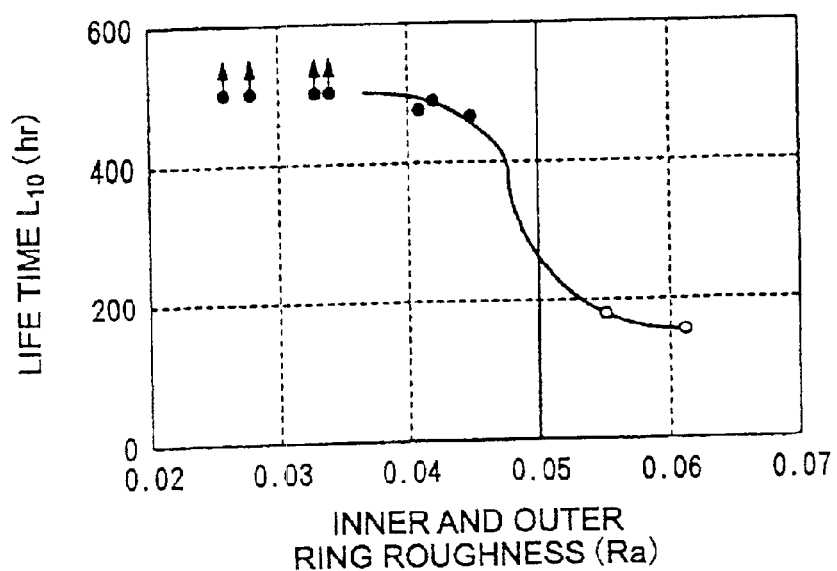
FIG. 2 is an explanatory graph illustrating a relation between the surface roughness of the inner and outer rings and life.
Figure 3:
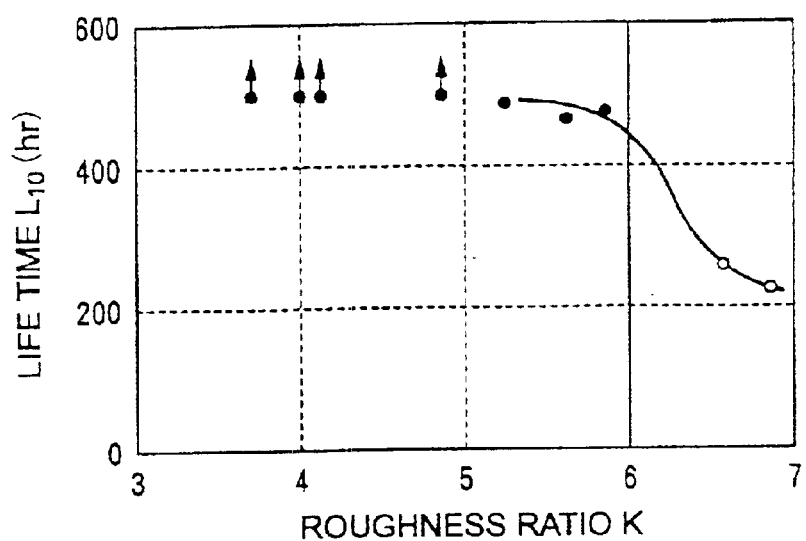
FIG. 3 is an explanatory graph illustrating a relation between the roughness ratio of the inner and outer rings to the rolling element and the life.

FIG. 1 is a cross sectional view for a rolling bearing of this embodiment. The rolling bearing is a deep groove ball bearing comprising a plurality of rolling elements (balls) 5, an inner ring 3 situated inward thereof, and an outer ring 1 situated outward of the rolling elements in which the rolling elements 5 are guided under rolling while being held between the inner ring 3 and the outer ring 1. In this embodiment, rolling grooves for guiding the rolling elements 5 are disposed in the inner ring 3 and the outer ring 1, and the rolling elements 5 are held being distributed evenly in the rolling grooves by a cage 6.

A first embodiment of the present invention is based on the rolling bearing put under a reduced pressure including vacuum and lubricated with a fluoro-lubricating oil as in a vacuum pump apparatus. Then, as an example of this embodiment and a comparative example, cages made of plastic as examples and made of metal as comparative examples were prepared as shown in the following Table 1. Cages of an identical shape were manufactured by using nylon 66 as polyamide and polyphenylene sulfide (PPS), namely, thermoplastic material as plastic cages for the examples and by using SPCC of low carbon steel plate as the steel plate and S50CM of tempered steel as metal cages for the comparative examples.

TABLE 1

| | | Class of materials | | |
|---|---|---|---|---|
| | | | | Plastic made |
| | | Metal made | | PPS |
| Material | | SPCC | S50CN | Nylon 66 | (GF25%) |
| Item | Density (g/cm$^3$) | 7.86 | 7.86 | 1.14 | 1.64 |
| | Linear expansion coefficient (10$^{-5}$ × 1/° C.) | 1.16 | 1.18 | 7~10 | 2~7 |
| | Young's modulus (GPa) | 210 | 210 | 3.3 | 7.5 |
| | Tensile strength (MPa) | 280 or more | 440 or more | 90 | 160 |
| | Hardness (note) | *105 or less | *180 or less | **120 | **120 |
| | Roughness (μm) | 0.025 | 0.025 | 2S or less | 2S or less |
| | Remark | Normalized | Tempered | Not strengthened | Glass fiber 25% |

(Note 1) The hardness value is based on Hv scale for metal made * and HRR scale for plastic made **.

On the other hand, the inner ring, the outer ring and the rolling element were made by using JIS bearing steel SUJ2, and quenched at 830° C. to 850° C., and then only the inner ring and the outer ring were tempered at 230° C. to 260° C. as a dimension stabilizing treatment, while the rolling element was tempered at a usual specification at 160° C. to 200° C. They were finished by grinding, to which various kinds of cages described above were combined to finally manufacture deep groove ball bearings 6206 having values according to JIS B 1518. For the roughness of the raceway surface, test bearings of different roughness to be described later were manufactured by changing the grinding method or applying finish grinding repeatedly.

Then, test conditions are to be described. A ball bearing life tester manufactured by Nihon Seiko Co. was used as a tester and basic rating life (10$^6$ rotation)$L_{10}$ under clean lubrication was measured. As the lubricating oil, a fluoro-lubricating oil J100 (perfluoropoly ether oil manufactured by NOK KLUEBER) as a purpose of the present invention and usual spindle oil RO#68 (paraffinic mineral oil) as comparative examples were used. Further, while this embodiment is directed for the rolling bearing used in a reduced pressure atmosphere, the test was conducted in this case in an atmospheric pressure for the sake of convenient, since the fluoro-lubricating oil, in particular, does not change so much either in vacuum or in atmospheric pressure. For making the lubricating condition severer, estimation was conducted at a test temperature between 80° C. and 120° C. assuming that the temperature of the lubricating oil rises to reduce the oil membrane.

(Life Test Condition)

| | |
|---|---|
| Name of Tester | Ball bearing life tester |
| Test Load | P/C = 0.45 |
| Number of Rotation of Bearing | 3000 rpm |
| Test Temperature | 80–120° C. |
| Lubricating oil | Fluoro-lubricating Oil J 100 |
| | Paraffinic Mineral Oil RO #68 |

The test method is as described below.

Each type of tested bearings was provided by ten and the life test was conducted under the test conditions described above. For the judgement of the life, test was terminated at the instance the vibration value of the tested bearing on the tester reached twice as much as the initial vibration value, and presence or absence of flaking on the raceway surface or wear in the rolling element or the pocket portion of the cage were confirmed. Further, the longest test time was set to 500 hrs and the subsequent test was terminated. Then, for the ten tested bearings, total time of rotation till flaking or wear occurred to those 10% bearings from the side of the shorter life was determined according to a weible distribution function, which was defined as the life. The following Table 2 shows the life time for Comparative Examples a–n lubricated with the paraffinic mineral oil RO#68 and Comparative Examples A –H and Examples I–P lubricated with the fluoro-lubricating oil J100. Those with the life time exceeding 500 hrs are indicated as terminated.

TABLE 2

| Lubrication condition | | | Material for cage | | | |
|---|---|---|---|---|---|---|
| Name of Lubricating oil | Temperature | Λ | SPCC | S50CM | Nylon 66 | PPS (GF25%) |
| RO#68 | 80° C. | 4.05 | (a)terminated | (d)terminated | (g)terminated | (k)terminated |
| RO#68 | 100° C. | 2.75 | (b)terminated | (e)terminated | (h)terminated | (l)terminated |

TABLE 2-continued

| Lubrication condition | | | | | | |
|---|---|---|---|---|---|---|
| Name of Lubricating oil | Temperature | A | SPCC | S50CM | Nylon 66 | PPS (GF25%) |
| RO#68 | 110° C. | 2.20 | — | — | (i)terminated | (m)terminated |
| RO#68 | 120° C. | 1.95 | (c)terminated | (f) 350 Hr | (j)terminated | (n)terminated |
| J100 | 80° C. | 5.60 | A:350 Hr | E:50 Hr | I:terminated | M:terminated |
| J100 | 100° C. | 3.85 | B:250 Hr | F:20 Hr | J:terminated | N:terminated |
| J100 | 110° C. | 3.11 | C:100 Hr | G:10 Hr | K:terminated | O:terminated |
| J100 | 120° C. | 2.60 | D:10 Hr | H:5 Hr | L:480 Hr | P:terminated |

As apparent from Table 2, in Comparative Examples a–n lubricated with the paraffinic mineral oil, since the wettability of the parafffinic mineral oil is favorable, peeling less occurred even in metal cages. However, under the conditions where test temperature was high and the oil membrane was reduced, flaking occurred due to peeling at several points in the cage made of S550 CM as the hardest material (Comparative Example f) and $L_{10}$ life was about 350 hrs. In view of the above, it can be seen that difference of the material for the cage gives no significant effect on the bearing life under the lubrication with the paraffinic mineral oil.

On the contrary, in Comparative Examples A —H lubricated with the fluoro-lubricating oil, the life was lowered by early peeling as the test temperature was higher. In the bearings after the test, rolling elements were damaged violently, for example, in the same manner as in defective commercial products and those of shorter life suffered from more wear. Further, peeling occurred in the inner rings and the outer rings. This supports the foregoing assumption that lubrication is insufficient between the pocket portion of the cage and the rolling element because of the poor wettability of the fluoro-lubricating oil to cause early wear or peeling in the early stage to shorten the bearing life as the hardness of the cage is higher or the lubricating oil membrane is reduced (=as the temperature is higher). Further, in the cage made of SPCC of lower hardness, oxide abrasion powder caused by metal contact was observed and this is considered that the oxide abrasion powder had more hardness than the cage, which resulted in indentation to the inner ring and the outer ring or caused abrasive wear between the inner ring and the outer ring and the rolling element.

On the other hand, Examples I–P using the case made of plastic showed long life even under lubrication with the fluoro-lubricating oil. This is considered that wear less occurs between the rolling element made of steel and the cage made of plastic and, in addition, secondary disadvantage such as indentation are less caused since the abrasion powder, if formed, is soft. Further, flaking occurred in the cage made of nylon 66 in Example L and this is considered that since the test temperature was as high as 120° C., the lubricant membrane was reduced and it was near the limit for the use of nylon 66, which caused abnormal rotation of the rolling element due to the deformation of the cage. Accordingly, the cage made of PPS is preferred, particularly, in a case where the working conditions include high temperature.

Then, in the same test method as described above, the surface roughness for each of the inner rings and the outer rings and the roughness ratio relative to the rolling elements were varied and a life test was conducted for combination of them. Table 3 shows the surface roughness and the roughness ratio relative to the rolling element. For the roughness ratio of the inner ring or the outer ring relative to the rolling element in the table, lower roughness for the inner ring or the outer ring, that is, those with larger values are adopted. All of Examples 1–10 using the fluoro-lubricating oil J100 as the lubricant satisfy the conditions described above for the surface roughness of the inner ring and the outer ring and the roughness ratio relative to the rolling element. In the same manner, among Comparative Examples 11 to 16 using the fluoro-lubricating oil J100 as the lubricant, Comparative Example 13 does not satisfy the surface roughness of the inner ring, Comparative Example 14 does not satisfy the surface roughness of the outer ring in view of the conditions described above and all of Comparative Examples 11 to 12, 15 and 16 do not satisfy the condition that the roughness relative ratio to the rolling element is 6 or less as described above. Comparative Examples 17 and 18 for reference use the paraffinic mineral oil RO#68 as the lubricant, in which Comparative Example 17 does not satisfy the surface roughness of the inner ring and Comparative Example 18 does not satisfy the roughness ratio relative to the rolling element in view of the conditions described above respectively. Further, test temperature was changed for Examples 9 and 10, Comparative Examples 15 and 16.

TABLE 3

| | Name of Lubricating oil | Test Temperature (° C.) | Mean Roughness (μm Ra) | | | Roughness Ratio K* | Life $L_{10}$ (hr) |
|---|---|---|---|---|---|---|---|
| | | | Inner Ring | Outer Ring | Rolling Element | | |
| Example | | | | | | | |
| 1 | J100 | 100 | 0.026 | 0.025 | 0.007 | 3.7 | Terminated |
| 2 | J100 | 100 | 0.027 | 0.028 | 0.007 | 4.0 | Terminated |
| 3 | J100 | 100 | 0.027 | 0.034 | 0.007 | 4.9 | Terminated |
| 4 | J100 | 100 | 0.032 | 0.041 | 0.007 | 5.9 | 475 |
| 5 | J100 | 100 | 0.033 | 0.026 | 0.008 | 4.1 | Terminated |
| 6 | J100 | 100 | 0.045 | 0.028 | 0.008 | 5.6 | 465 |
| 7 | J100 | 100 | 0.042 | 0.032 | 0.008 | 5.3 | 486 |
| 8 | J100 | 100 | 0.043 | 0.045 | 0.008 | 5.6 | 465 |
| 9 | J100 | 110 | 0.043 | 0.032 | 0.008 | 5.4 | 442 |
| 10 | J100 | 120 | 0.043 | 0.044 | 0.008 | 5.5 | 425 |
| Comp. | | | | | | | |

TABLE 3-continued

| Name of Lubricating oil | Test Temperature (° C.) | Mean Roughness (μm Ra) | | | Roughness Ratio K* | Life $L_{10}$ (hr) |
| --- | --- | --- | --- | --- | --- | --- |
| | | Inner Ring | Outer Ring | Rolling Element | | |
| Example | | | | | | |
| 11 J100 | 100 | 0.028 | 0.048 | 0.007 | 6.9 | 230 |
| 12 J100 | 100 | 0.046 | 0.032 | 0.007 | 6.6 | 265 |
| 13 J100 | 100 | 0.055 | 0.025 | 0.012 | 4.6 | 180 |
| 14 J100 | 100 | 0.027 | 0.061 | 0.015 | 4.1 | 160 |
| 15 J100 | 110 | 0.028 | 0.048 | 0.007 | 6.9 | 85 |
| 16 J100 | 120 | 0.047 | 0.032 | 0.007 | 6.7 | 35 |
| 17 RO#68 | 100 | 0.055 | 0.025 | 0.012 | 4.6 | Terminated |
| 18 RO#68 | 100 | 0.027 | 0.048 | 0.007 | 6.9 | Terminated |

As apparent from Table 3, all of Examples 1 to 10 satisfying the conditions described above in view of the surface roughness of the inner ring and the outer ring and the roughness ratio thereof relative to the rolling element attained long life in excess of 400 hours, even under severe lubricating condition with the fluoro-lubricating oil of poor wettability. This demonstrates that the surface roughness of the inner ring and the outer ring and the roughness ratio thereof relative to the rolling element have an effect on the contact wear. On the contrary, Comparative Examples 13 and 14 having the surface roughness of the inner ring or the outer ring in excess of 0.05 μm Ra or Comparative Examples 11 and 12 having the roughness ratio relative to the rolling element in excess of 6 show apparently short life and, Comparative Examples 15 and 16 for which the test temperature was further elevated showed further shorter life. However, since the Comparative Example 17 having the surface roughness of the inner and outer rings in excess of 0.05 μm Ra and Comparative Example 18 having the roughness ratio relative to the rolling element in excess of 6 also had long life under the lubricating condition with the mineral oil, it was confirmed that the problems described above are inherent to the fluoro-lubricating oil.

Then, a second embodiment of the rolling bearing according to the present invention is to be described. This embodiment is also based on the rolling bearing used under reduced pressure including vacuum and lubricated with the fluoro-lubricating oil as in vacuum pump apparatus like that in the first embodiment. Then, as examples and comparative examples of this embodiment, film coating treatment as shown in the following Table 4 was applied to deep groove ball bearings 6206 having values according to JIS B 1518 (refer to FIG. 1 of the first embodiment). Among them, in Examples 101–107 of the present invention, a coating film of a higher hardness than that of usual bearing steel SUJ2 (Hv: 750–800) after quenching is coated at least to rolling elements and, preferably, to all components. On the contrary, in Comparative Examples 101 and 102, nickel or Ni—P films are coated to all of the components, but their hardness is low. Further, in Comparative Example 103, while the hardness of film is sufficiently high, it is coated only to the inner and outer rings except for the rolling element.

TABLE 4

| | | Example 101 | Example 102 | Example 103 | Example 104 |
| --- | --- | --- | --- | --- | --- |
| Film | Kind | Ni—P | Cr | TiN | CrN |
| | Film coated on | All component | All component | All component | All component |
| | Hardness (HV) | 750~800 | 900~1000 | 2000~2400 | 2000~2200 |
| | Treating method | Electroless plating | Electrolytic plating | Ion plating | Ion plating |
| Rolling element wear rate | | 0.6 | 0.4 | 0.2 | 0.2 |

| | | Example 105 | Example 106 | Example 107 |
| --- | --- | --- | --- | --- |
| Film | Kind | TiCN | DLC | TiN |
| | Film coated on | All component | All component | Only rolling element |
| | Hardness (HV) | 3000~3500 | 3000~5000 | 2000~2400 |
| | Treating method | Ion plating | CVD | Ion plating |
| Rolling element wear rate | | 0.1 | 0 | 0.4 |

| | | Comp. Example 101 | Comp. Example 102 | Comp. Example 103 |
| --- | --- | --- | --- | --- |
| Film | Kind | Ni | Ni—P | TiN |
| | Film coated on | All component | All component | only inner and outer rings |
| | Hardness (HV) | 220 | 500 | 2000~2400 |
| | Treating method | Electrolytic Plating | Electroless plating | Ion plating |
| Rolling element wear rate | | 1 | 1 | 1 |

The conditions for bearing wear test are as shown below.

| Rolling Bearing | 6206 (bearing steel SUJ2 Hv 760) |
| --- | --- |
| Surface Pressure | 180 kgf/mm² |
| Temperature | 150° C. |
| Rotational Speed | 3600 rpm |
| Lubricating Oil | Fluoro-oil (FOMBLIN OIL Y 25 (manufactured by AUSIMONT CO.) |
| Test Time | 100 hrs |
| Film Thickness | 2–5 μm |

Figure 4:
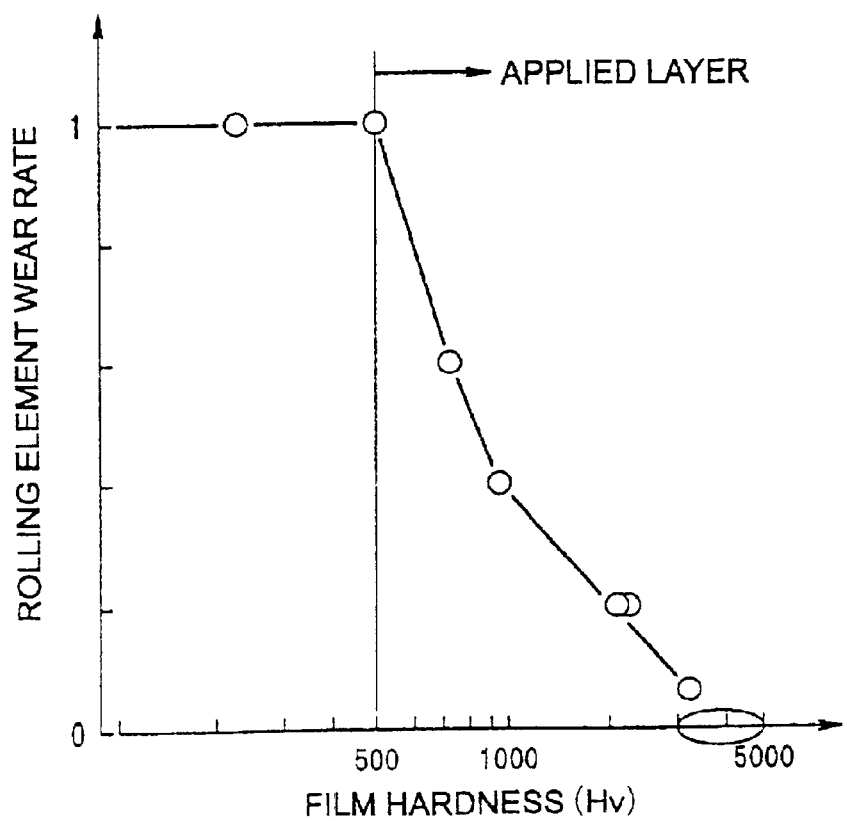
FIG. 4 is an explanatory graph illustrating a relation between the hardness of the coating film and the wear rate of the rolling element.

FIG. 4 shows a relation between the ratio of the wear rate of the rolling element and the hardness of the film in Examples 100 to 107 based on the wear rate of the rolling element of Comparative Examples 100 to 103 defined as 1. As apparent from the FIG. 4, wear amount of the rolling element decreases as the hardness of the film is high. Further, wear is further reduced particularly in Examples 101 to 106 since the reactivity of the ceramic hard film with the fluoro-lubricating oil is low. Further, in Example 107 in which the film is coated only on the rolling element, the wear amount of the rolling element is larger than that in the case where the film is covered to all components in Examples 101 to 106, but the amount is still much smaller compared with Comparative Examples 101 to 103. Further, in Comparative Examples 101 and 102, since the hardness of the film is softer than that of the substrate, the film tends to be worn in the initial stage. Further, in Comparative Example 103 in which the film is coated only on the inner and outer rings, wear of the rolling element can not be prevented.

As described above, in this embodiment of coating the film harder than that of the substrate to at least the rolling element, preferably, to all components, wear of the rolling element can be reduced and long life can be attained even under a severe lubricating condition with the fluoro-lubricating oil.

Then, a third embodiment of the rolling bearing according to present invention is to be described. This embodiment is also based on the rolling bearing used in a reduced pressure including vacuum, and under lubrication with a lubricating oil or grease containing a fluoro-containing polymer or in an atmosphere containing a gas comprising fluorides in the same way of the first embodiment. At first, as alloy steels forming inner rings, outer rings and rolling elements, those of the compositions shown in Table 5 were prepared. All units for the numerical values of Table 5 are on the weight % basis.

TABLE 5

|   | Cr | Si | N | Other main ingredient |
|---|---|---|---|---|
| A | 8.0 | 1.50 | — | C: 0.5, Mn: 0.5, Ni: 0.3 |
| B | 10.0 | 0.60 | — | C: 1.0, Mo: 0.3 |
| C | 13.0 | 0.30 | 0.14 | C: 0.45, Mn: 0.3 |
| D | 15.5 | 0.40 | 0.17 | C: 0.40, Mo: 1.0, Mn: 0.55 |
| E | 15.1 | 0.45 | 0.19 | C: 0.45, Mo: 0.48, Mn: 0.58, V: 1.0 |
| F | 16.0 | 0.30 | 0.19 | C: 0.30, Mo: 3.0, Mn: 0.30, Co: 3.0 |
| G | 25.0 | 0.80 | 0.22 | C: 0.15, Mn: 1.0 |
| H | 1.45 | 1.0 | — | C: 0.38, Mo: 0.95, Mn: 0.70 |
| I | 10.0 | 0.60 | — | C: 1.0, Mo: 0.3 |
| SUJ2 | 1.0 | 0.20 | — | C: 1.0, Mn: 0.35 |
| SUS440C | 17.0 | 0.40 | — | C: 1.0, Mo: 0.3 |
| SUS630 | 16.0 | 0.40 | — | C: 0.05, Mo: 3.0, Mn: 0.30, Cu: 4.0 Ni: 4.0 |

Using the alloy steels described above, inner rings, outer rings and rolling elements of single row deep groove ball bearings (bearing number 6206: outer diameter 62 mm, inner diameter 30 mm, width 16 mm, refer to FIG. 1 for the first embodiment) were formed and rolling bearings were assembled by the combination shown in Table 6. Each of the samples was manufactured so as to be quite identical excepting for the alloy steels used. That is, the inner ring, the outer ring and the rolling element of each of the samples was applied with quenching and tempering under the conditions to obtain a predetermined surface hardness (450 or more by Vicker's hardness).

For each of the assembled rolling bearings, a rotation test was conducted for the following conditions by using a bearing rotation tester manufactured by Nippon Seiko Co. and the bearing life was evaluated on the basis of vibration values. That is, radial vibrations caused in the bearing were always measured in the rotation test and the test was terminated at the time the vibration value reached three times as much as the initial value, and the time up to this was defined as the life.

(Condition For Rotation Test)

| Atmospheric Temperature | 150° C. |
|---|---|
| Atmospheric Pressure | vacuum ($1 \times 10^{-4}$ Torr) |
| Axial Load | 1000 N |
| Radial Road | 500 N |
| Rotational speed | 300 rpm |
| Lubricating agent | "FONBLIN M15" (Perfluoropoly ether oil) manufactured by AUDIMOND CO. |

Further, for comparing the life of each of the tested bearings, relative values were calculated based on the life of Comparative Example 401 corresponding to the existent example defined as "1".

The results are also shown in Table 6.

TABLE 6

|   | Inner ring and outer ring | Rolling element | Life |
|---|---|---|---|
| Example 401 | SUJ2 | A | 4 |
| Example 402 | SUJ2 | B | 5 |
| Example 403 | SUJ2 | SUS440C | 8 |
| Example 404 | SUJ2 | C | 15 |
| Example 405 | SUJ2 | D | 13 |
| Example 406 | SUJ2 | E | 15 |
| Example 407 | SUJ2 | F | 12 |
| Example 408 | SUJ2 | SUS630 | 10 |
| Example 409 | SUJ2 | G | 3 |
| Example 410 | H | C | 20 |
| Example 411 | I | I | 10 |
| Example 412 | SUS440C | SUS440C | 15 |
| Example 413 | C | C | 40 |
| Example 414 | F | F | 28 |
| Example 415 | D | D | 33 |
| Example 416 | E | E | 40 |
| Example 417 | SUS630 | SUS630 | 25 |
| Example 418 | SUS440C | C | 30 |
| Example 419 | F | C | 45 |
| Example 420 | SUS630 | C | 35 |
| Comp. Example 401 | SUJ2 | SUJ2 | 1 |

As can be seen from the results, bearings of Examples 401 to 420, in which the alloy steels forming at least the rolling elements satisfied the range of the present invention had longer bearing life in a case of using the perfluoropolyether oil as the lubricant and used under high temperature and high speed rotation, compared with the bearing of Comparative Example 401 in which both the rolling elements and the inner outer rings comprised SUJ2.

Further, in Examples 401 to 409, in which the inner and outer rings comprised SUJ2 and the alloy steels forming the rolling element were different within the range of the present invention, Examples 404–407 having the N-content of 0.05% by weight or more and less than 0.2% by weight had longer bearing life, compared with Examples 401 to 403 and Examples 408 and 409 with the content of N being out of the range described above.

Further, in a case where not only the rolling elements but also the inner rings and the outer rings were formed of the alloy steels capable of satisfying the range of the present invention as in Examples 410 to 420, the bearing life could be extended further.

In this embodiment, descriptions have been made to the bearing life under high temperature and high speed rotation in a case of using the perfluoropolyether oil as the lubricant, but the bearing life can be increased also in the case under lubrication with lubricating oil or greases containing fluoro-containing polymers other than the perfluoro ether oil or in the case of atmosphere containing a gases comprising fluorides, by making the alloy steels forming at least the rolling elements satisfying the range of the present invention.

Then, a fourth embodiment of rolling bearings according to the present invention is to be described. Also this embodiment is based on the rolling bearing used under reduced pressure including vacuum and under lubricating condition with a lubricant containing a fluoric polymer as in vacuum pump apparatus, as well as heat roll portions in fixing sections of business machines and vacuum equipments for manufacture of semiconductors, in the same way of the first embodiment.

At first, a duration life test conducted under the conditions of using fluoro-lubricating agent, at high temperature, high speed and high vacuum is to be described.

Tested Roll Bearing:

Bearing Number: 6206

Inner Diameter: 30 mm

Outer Diameter: 62 mm

Width: 16 mm (For the shape, refer to FIG. 1 for the first embodiment.)

Various combinations of materials for each of the inner rings, outer rings and the rolling elements were prepared. As the material for the rolling elements of the rolling bearing in the examples, alumina was used for Example 502 and partially stabilized zirconia was used for other examples. On the other hand, the rolling element in Comparative Examples 501 was SUJ2 and the rolling element in Comparative Example 502 was silicon nitride.

Test Method:

Tested bearings were mounted to a bearing rotation tester manufactured by Nihon Seiko Co. and a rotation test was conducted under the following test conditions to evaluate life based on the vibration values. In this test, the life for the tested bearings was defined as the time when the vibration value increased to three times as much as the initial value. The life for the rolling bearings in each of the examples and the comparative examples is indicated by relative values based on the value in Comparative Example 501 as 1.

TEST CONDITION:

| Temperature | 120° C. |
|---|---|
| Atmosphere | vacuum (1.33 × 10$^{-2}$ Pa) |
| Rotation speed | 5000 rpm |
| Axial load | 1000 N |
| Radial load | 500 N |
| Lubricating agent | "FONBLIN M15" (PFPE oil) manufactured by AUDIMOND CO. |

Test results are shown in Table 7

TABLE 7

| | Inner ring | Outer ring | Rolling element | Life |
|---|---|---|---|---|
| Comp. Example 501 | SUJ2 | SUJ2 | SUJ2 | 1 |
| Comp. Example 502 | SUJ2 | SUJ2 | Silicon nitride | 1.5 |
| Example 501 | SUJ2 | SUJ2 | Partially stabilized zirconia | 10 |
| Example 502 | SUJ2 | SUJ2 | Alumina | 5 |
| Example 503 | SHX | SHX | Partially stabilized zirconia | 15 |
| Example 504 | SUS440C | SUS440C | Partially stabilized zirconia | 20 |
| Example 505 | ES1 | ES1 | Partially stabilized zirconia | 30 |
| Example 506 | ES2 | ES2 | Partially stabilized zirconia | 25 |
| Example 507 | SUS630 | SUS630 | Partially stabilized zirconia | 15 |

From the results of Table 7, it is apparent that all the rolling bearings of the examples of the present invention (Examples 501 to 507) show extremely long life compared with comparative examples, under the conditions of PFPE oil lubrication, high temperature and high speed.

Then, a wear test for rolling bearings used in vacuum pumps conducted under fluoric lubrication is to be described.

Tested Roll Bearing:

Bearing number 6206 (material for inner ring and outer ring: bearing steels SUJ2, hardness: Hv 760).

13 Cr martensitic stainless steel comprising C: 0.45% by weight, Cr: 13.04% by weight and N: 0.13% by weight was used as the material for rolling elements except for Comparative Example 503 (SUJ2)

They were subjected to cold working (header), and deburring or grinding to manufacture ball materials. The ball materials were quenched at 1060° C., subjected to a subzero treatment at −80° C. and tempered at 160° C., which were then finished to a predetermined accuracy. Then, they were applied with nitridation using NV nitridation Process (trade name of Daido Hokusan Co.) and with finishing lapping to condition to an identical surface roughness with that for SUJ2 steel balls (refer to Table 8, Table 9).

Referring to the Nv nitridation process, this treatment comprises a process of applying fluorination by using a fluoro-gas such as NF3 (nitrogen trifluoride) at about 200 to 400° C. as the pretreatment for the nitridation and a process of conducting nitridation using an NH$_3$ gas. Cr oxide layers inhibiting the nitriding reaction are removed by the fluorination treatment, the surface of the surface layer formed with an extremely thin fluoride layer is highly activated thereby enabling to form a uniform nitride layer stably in the subsequent nitridation treatment, which can be applicable suitably to martensitic stainless steel at high hardness and excellent in wear resistance.

A compound layer with a thickness of 1.4% Da as the steel ball diameter ratio was formed as the nitride layer by the nitridation process and the surface hardness was adjusted by the amount taken from the surface of the steel ball after nitridation (the hardness is lowered as the amount is larger). Thus, specimens in which the nitride layer was formed on the surface of the rolling element of each of the tested bearings, to change the surface hardness and the roughness variously were prepared.

The bearing life can be further improved by applying the same nitridation layer as the rolling element also for the inner ring and the outer ring. However, since it is more difficult to apply the nitridation layer to the inner ring and the outer ring compared with the rolling element, the rolling bearings of No. 6206 in which only the surface roughness was made nearly identical with the surface roughness of the nitride layer of the rolling element in Example 503 (0.005 μm) were used without conducting the nitridation to the inner and outer rings and the wear amount thereof was determined as the life.

Test Method:

Each of the tested bearings in the Examples and the comparative examples were mounted as specimens to a bearing rotation tester manufactured by the applicant's company and rotated for 100 hours under lubrication with the fluoro-oil. Subsequently, the tested bearing were decomposed and the wear amount of the rolling elements were measured respectively. The wear rate of the rolling element for each of the examples and the comparative examples was indicated by relative amount based on the wear amount of Comparative Example 503 (not treated bearing) defined as 1.

Condition for Wear Test:

| Rolling Bearing | 6206 (bearing steel all with SUJ2 Hv 760) |
|---|---|
| Surface pressure | 1764 MPa |
| Temperature | 150° C. |
| Rotational Speed | 3600 rpm |
| Lubricating Oil | "FOMBLIN OIL Y 25" (fluoro-oil) manufactured by AUSIMONT CO. |
| Test time | 100 hrs |

Test results are shown in Table 8 and Table 9

TABLE 8

| | | Example 501 | Example 502 | Example 503 | Example 504 |
|---|---|---|---|---|---|
| Nitridation film on rolling element | Hardness | Hv910 | Hv1050 | Hv1050 | Hv1210 |
| | Roughness | 0.003 μm | 0.005 μm | 0.003 μm | 0.003 μm |
| Nitridation film on inner ring | | none | none | none | none |
| Nitridation film on outer ring | | none | none | none | none |
| Wear rate | | 0.2 | 0.1 | 0.05 | 0.05 |

TABLE 9

| | | Comp. Example 501 | Comp. Example 502 | Comp. Example 503 | |
|---|---|---|---|---|---|
| Nitridation film on rolling element | Hardness | Hv850 | Hv1050 | Hv760 | No nitridation film |
| | Roughness | 0.003 μm | 0.007 μm | 0.003 μm | |
| Nitridation film on inner ring | | none | none | | none |
| Nitridation film on outer ring | | none | none | | none |
| Wear rate | | 0.8 | 0.7 | | 1 |

From the results in Table 8 and Table 9, it is apparent that the wear amount is extremely small in all of the rolling bearings in the examples in this wear test (Examples 501–504) compared with comparative examples under the conditions of lubrication with fluoro-oil, high temperature and high speed.

Figure 5:
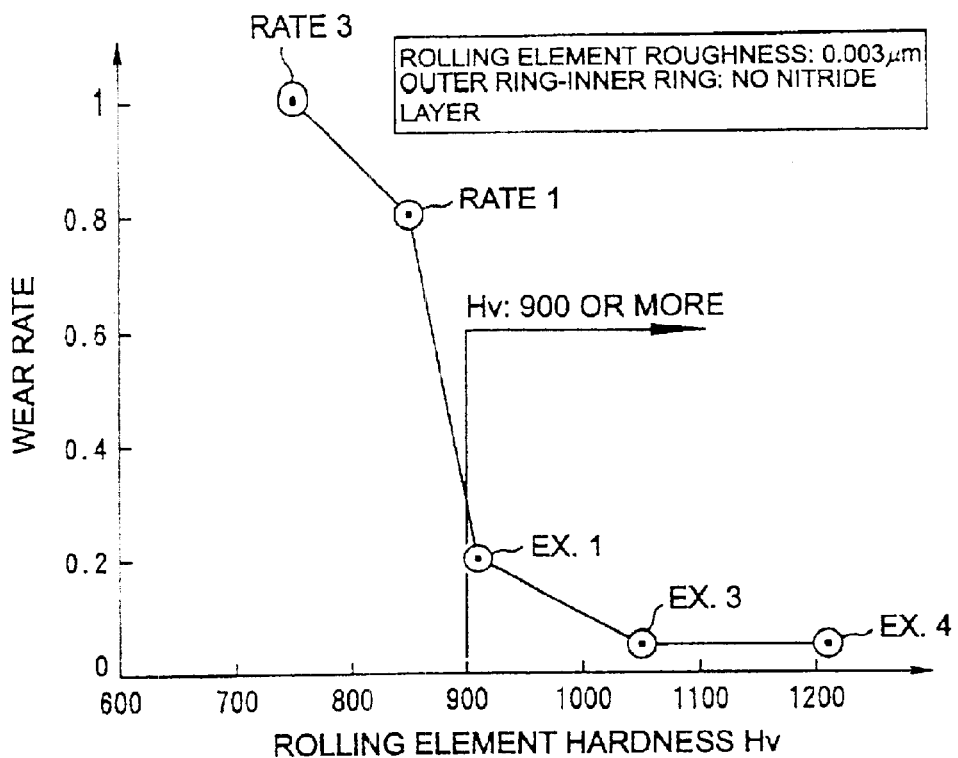
FIG. 5 is an explanatory graph illustrating a relation between the hardness of the rolling element and the wear rate.

Among them, a relation between the hardness of the rolling element and the wear rate is arranged and shown in FIG. 5 for Example 501, Example 503, Example 504 and Comparative Example 501 and Comparative Example 503 having a roughness of 0.003 μm Ra of rolling element in common. It can be seen from the graph that the bearings show outstandingly excellent wear resistant characteristic and have long life in a case at a hardness of rolling element of Hv 900 or more under the condition where the roughness of the rolling element is constant (0.003 μm).

Figure 6:
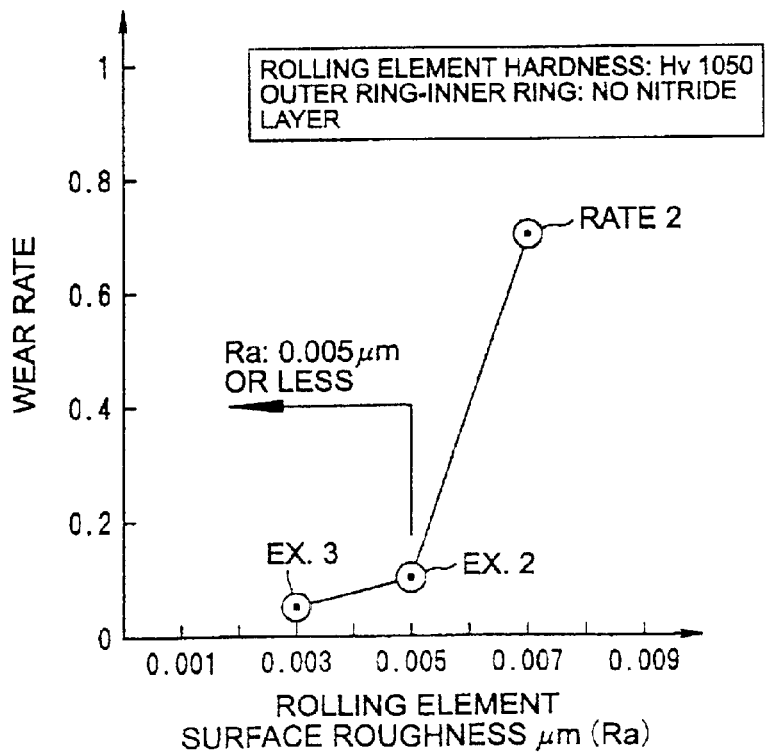
FIG. 6 is an explanatory graph illustrating a relation between the surface roughness of the rolling element and the wear rate.

Then, a relation between the surface roughness of the rolling element and the wear rate is arranged and shown in FIG. 6 for Example 502, Example 503 and Comparative Example 502 having a hardness of rolling element at Hv 1050 in common. It can be seen from the FIG. 6 that the bearings show outstandingly excellent wear resistant characteristic and have long life in a case at the surface roughness of the rolling element of 0.005 μm Ra or less under the condition where the hardness of the rolling element is constant (Hv 1050).

Accordingly, excellent life under the condition of lubrication with fluoro-oil, at high temperature and high speed or in a vacuum atmosphere can be provided by the provision of a dense nitride layer at least on the surface of the rolling element of the rolling bearing, constituting the nitride layer with the compound layer having a hardness Hv of 900 or more and making the roughness thereof to 0.005 μm Ra or less.

The oxide ceramics or the dense nitridation layer in the present invention is not restricted only on the surface of the rolling element but, for example, the rolling element itself can be made of oxide ceramics.

A fifth embodiment of a rolling bearing according to the present invention is to be described next. Like that the first embodiment, this embodiment is also based on the rolling bearing used in reduced pressure including vacuum such as in vacuum pump apparatus, particularly, dry vacuum pump apparatus and lubricated with fluoro-lubricating oil. Then, in this embodiment, so-called full complement angular ball bearings with no cage in which rolling elements (balls) are closed arranged between the inner ring and the outer ring were used instead of the deep groove ball bearings used in each of the embodiments described above.

Table 10 shows the contact angle in each of the angular ball bearings (all full complement type) provided as examples and comparative example in this embodiment. Various film layers were applied on the rolling bearings and a wear test was conducted under fluoro-oil lubrication. For the evaluation, the wear amount of the rolling element was measured after 100 hours rotation, a test identical with that for the deep groove ball bearings entirely made of SUJ2 in which rolling elements are held by a pressed ribbon cage and the result was indicated by relative values (wear rate of rolling element) based on the wear amount of rolling element defined as 1. All of the rolling bearings are full complement (with no cage) angular ball bearings in which both of rolling elements and inner and outer rings were made of SUJ2 and applied with quenching and tempering.

(Bearing Wear Test)

| Rolling bearing | JIS bearing No. 7206 (inner, outer rings: made of bearing steel: SUJ2, full complement type) |
|---|---|
| Surface pressure | 180 kgf/mm² |
| Temperature | 150° C. |
| Rotational speed | 3600 rpm |
| Lubricating oil | "FOMBLIN OIL Y 25" (fluoro-oil) manufactured by AUSIMONT CO. |
| Test time | 100 hrs |

TABLE 10

|  | Contact Angle (°) | Wear Rate of Rolling Element |
|---|---|---|
| Example 301 | 10 | 0.3 |
| Example 302 | 15 | 0.2 |
| Example 303 | 20 | 0.15 |
| Example 304 | 30 | 0.2 |
| Example 305 | 45 | 0.3 |
| Comp. Example 301 | 5 | 0.8 |
| Comp. Example 302 | 55 | 0.8 |

Figure 7:
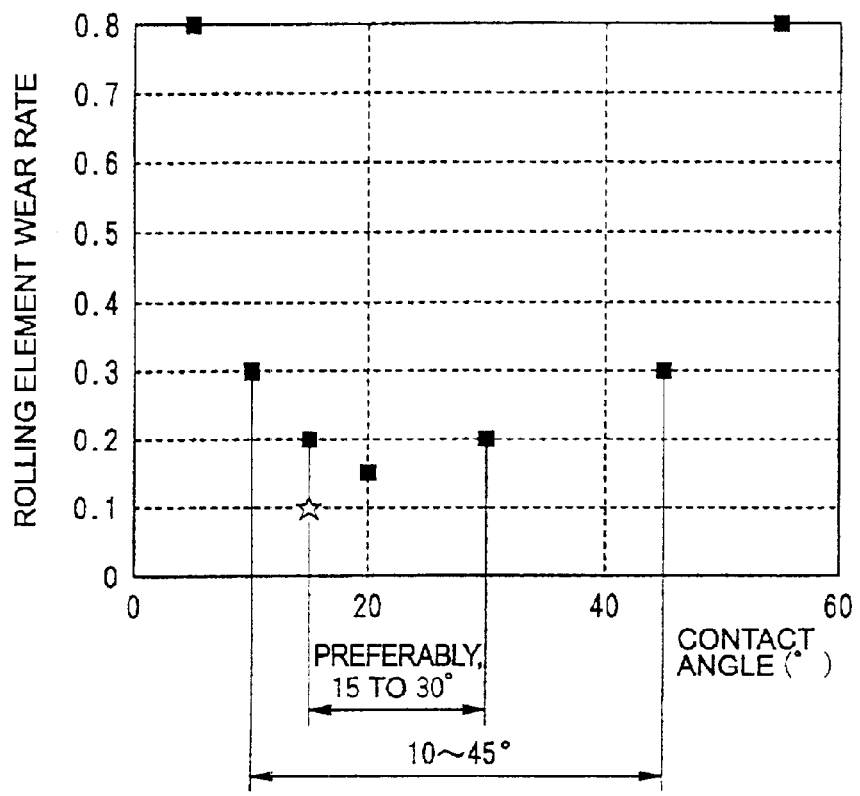
FIG. 7 is an explanatory graph illustrating a relation between the contact angle of a full complement angular ball bearing and the wear rate of a rolling element.

A relation between the thus obtained wear rate of rolling element and the contact angle contact of the angular ball bearing is arranged and shown in FIG. 7. In the graph, the wear rate of the rolling element of the angular ball bearings in which all the rolling elements (balls) are made of silicon nitride ($Si_3N_4$) and the contact angle is 15° (equivalent with Example 302) is indicated by an asterisk as a reference. As apparent from the graph, the wear rate of the rolling element is small at the contact angle of 10 to 45° also in the angular ball bearing entirely made of SUJ2 and the contact angle is further preferably from 15 to 30°.

Figure 25:
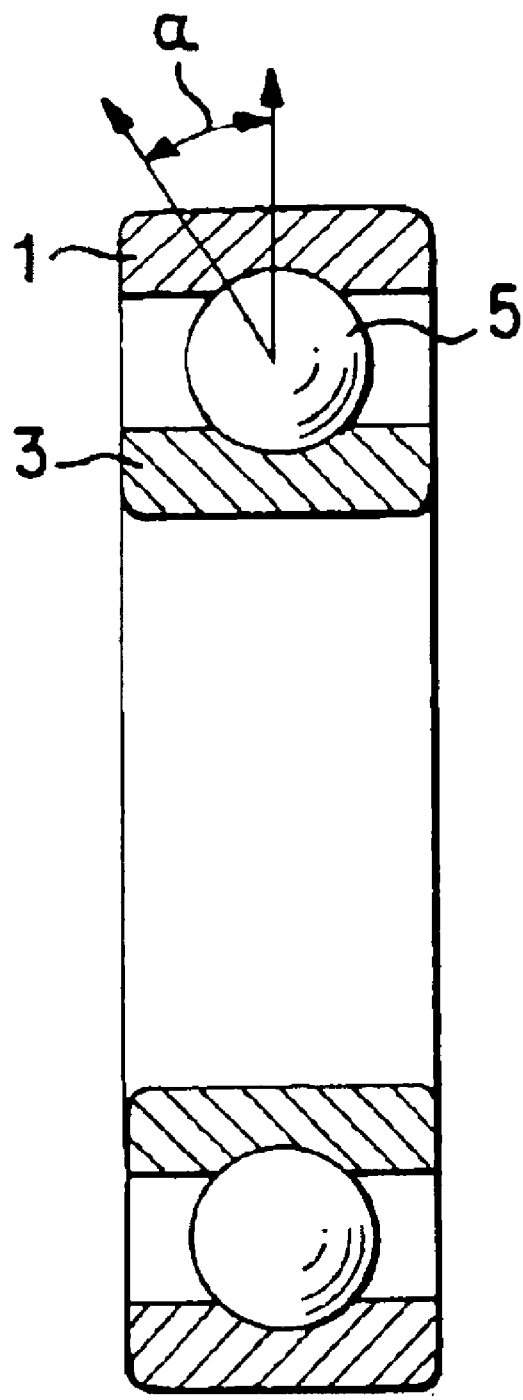
FIG. 25 is a longitudinal cross sectional view illustrating the embodiment of the present invention which is also shown in FIG. 7.

FIG. 25 shows the full complement angular ball bearing having a contact angel α from 10 to 42°, preferably form 15° to 30°.

As described above, for the rolling bearing used in vacuum or a reduced pressure condition and lubricated with fluoro-lubricating oil, it is preferred to use a full complement angular ball bearing with no cage and, further, contact angle is preferably from 10 to 45° and, preferably, from 15 to 30°. Further, when the definition in the first embodiment, that is, the surface roughness of the inner and outer rings is 0.05 μm Ra or less and the roughness ratio relative to the rolling element is 6 or less is added in this embodiment, the peeling flaking is suppressed and further longer life can be expected under severe lubricating condition with fluoro-lubricating oil. Further, when a definition in the first embodiment and/or second embodiment, that is, the definition that a film layer harder than the hardness of the substrate is coated on at least the rolling element, preferably, on all components is added to this embodiment, the wear of the rolling element can be reduced and a long life can be attained even under severe lubricating condition with the fluoro-lubricating oil. Further, when the definition in the first embodiment and/or second embodiment and/or third embodiment, that is, the definition that the Cr content in the alloy steel for the rolling element is 7% by weight or more and 27% by weight or less is added to this embodiment, longer life can be expected in a case when it is used at high temperature and high speed rotation under severe lubricating condition with the fluoro-lubricating oil. When the definition in the first embodiment and/or second embodiment and/or third embodiment and/or fourth embodiment, that is, the definition that the rolling element comprises oxide ceramics or a dense nitride layer is provided on the surface of the rolling element and the surface roughness of the rolling element is 0.005 μm Ra or less and the surface hardness is Hv 900 or more is added to this embodiment, further longer life can be expected even under severe lubricating condition with fluoro-lubricating oil by the improvement of the wear resistance.

Then, a sixth embodiment of the rolling bearing according to the present invention is to be described. Like that the first embodiment, also this embodiment is based on the rolling bearing used in reduced pressure including vacuum such as in vacuum pump apparatus and lubricated with fluoro-lubricating oil. Then, in this embodiment, thrust ball bearings are used instead of the deep groove ball bearings or angular ball bearings used in the respective embodiments described above.

Figure 8:
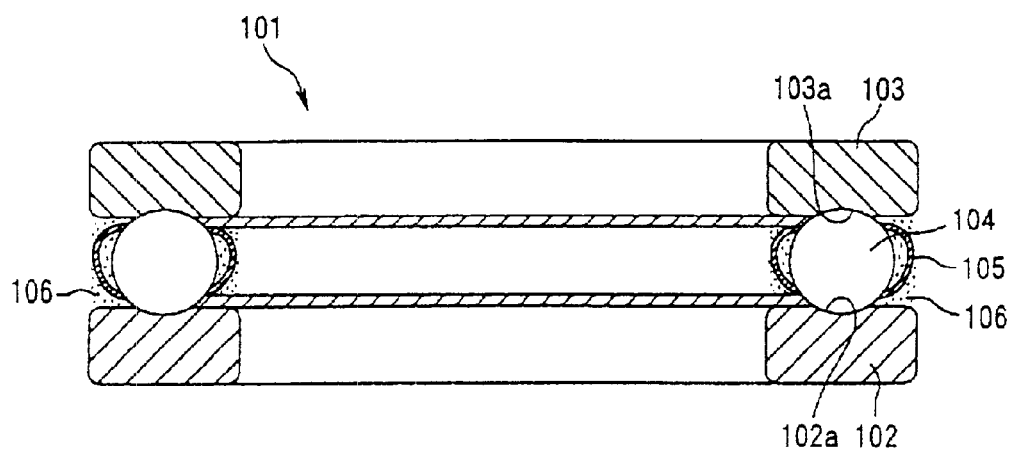
FIG. 8 is a cross sectional view of a thrust ball bearing illustrating an embodiment of a rolling bearing according to the present invention.

FIG. 8 is a cross sectional view illustrating a structure of a thrust ball bearing 101 of this embodiment.

The thrust ball bearing 101 (Manufactured by Nippon Seiko Co., bearing No. 51305) comprises an outer ring 102, an inner ring 103, a plurality of balls (rolling element) 104 rotatably disposed between both of the rings 102 and 103, a cage 105 for holding a plurality of balls 104 between both of the rings 102 and 103, and fluoro-lubricating oil 106 charged in a gap formed between both of the rings 102 and 103 in which the balls 104 are disposed internally.

Then, rolling grooves are formed in both of the rings 102 and 103 for guiding the balls 104 and a surface treatment is applied to the raceway surfaces 102a and 103a thereof. For the surface treatment, barrel treatment or cloth treatment is adopted preferably.

Further, the fluoro-lubricating oil 106 was used being filtered through a 10 μm filter before it was filled in the gap for the thrust ball bearing 101. It is necessary to use the filter capable of removing obstacles contained in the fluoro-lubricating oil 106.

In the raceway surfaces 102a and 103a of the thrust bearing 101, obstacles such as abrasive grains having a mean diameter of 3 μm or more were not confirmed.

JIS bearing steel material SUJ2 was used for the outer ring 102, outer ring 103 and ball 104, which were quenched at 830 to 850° C. Subsequently, the outer ring 102 and the inner ring 103 were applied with tempering at 230 to 260° C. as the size stabilizing treatment, while the ball 104 was applied with tempering of usual specification at 160 to 200° C. Subsequently, thrust ball bearings having values in accordance with JIS B 1518 were manufactured by usual grinding.

Those bearings similar with such thrust ball bearing 101 applied with surface treatment under various conditions were provided and the life test was conducted therefor.

Barrel treatment and cloth treatment were conducted as the surface treatment.

Abrasive grains used for the barrel treatment were defined to alumina abrasive grains used for the working of bearings. Treatment was applied using abrasive grains of various sizes to manufacture bearings for use in the test. Each of the alumina abrasive grains (chips) used is a chip comprising melted alumina as the main ingredient and includes four types of alundum # 100 (in a case of intense grinding wheel), alundum # 150 (in a case of medium grinding wheel), alumina #1500 to 2000 (in case of gloss polishing wheel) and alumina # 4000 to 4600 (in a case of super floss polishing wheel) (each manufactured by Nippon Daiya Industry Co.).

In the manufacture of the bearings, since the size of the abrasive grains used is different depending on the working steps, the four types of chips as described above were used for the barrel treatment with an aim of determining the size of the abrasive grains for the step. Treating time was 60 min for each case and only the effect of the size of the abrasive grains on the life could be confirmed.

The cloth treatment is a treatment of polishing the raceway surface of the completed bearing in a state of winding a cloth made of relatively tough or strong rigid fibers (hereinafter referred to as cloth) around a rod made of wood or the like. Regarding the cloth treatment, bearing for use in test were manufactured by using wiping cloth (trade name of products: Zavina minimax, manufactured by Kanebo Gosen Co.) as the cloth under the five type of conditions of 0, 30, 60, 120 and 180 sec. The load of pressing the cloth was made constant.

The thrust ball bearing for use in test manufactured as described above was measured for the basic rating life ($10^6$ rotation) $L^{10}$ under the condition at a test load: P/C=0.45, number of rotation of the bearing: 5000 rpm, under clean lubrication by using a thrust type bearing life tester manufactured by Nippon Seiko Co. Commercially available fluoro-lubricating oil was used for the lubricating oil. Since the fluoro-lubricating oil scarcely changed either in vacuum or in atmospheric pressure, this life test was conducted in the atmospheric pressure. Further, assuming a case where the temperature of the lubricating oil rises to make the formation of the oil membrane insufficient, evaluation was conducted at a test temperature of 100 to 120° C. for severe lubricating condition.

Further, the test was conducted by using two types of the fluoro-lubricating oil, that is, not filtered and filtered through 10 μm filter. Since the fluoro-lubricating oil is sometimes used by taking out a necessary amount of use (on the users side) into another container, it may be considered that obstacles may include upon this transfer. Therefore, filtration through the 10 μm filter can remove large obstacles without deteriorating the ingredient of the fluoro-lubricating oil. In view of the property of the filter (bridging effect), it is considered that obstacles even of 10 μm or less can also be removed, the 10 μm filter was used.

Figure 9:
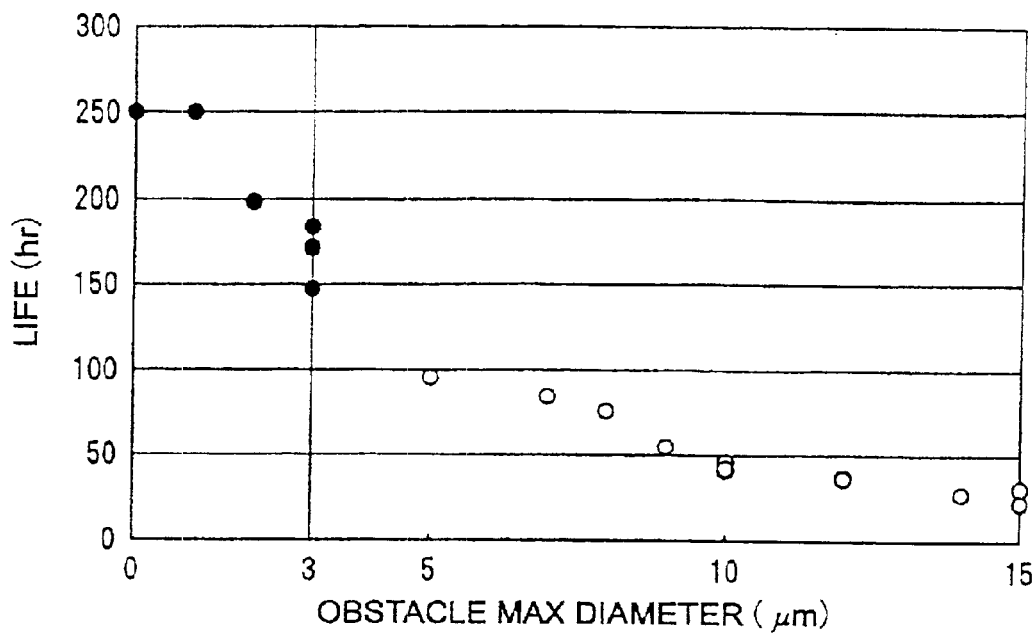
FIG. 9 is an explanatory graph illustrating a relation between the maximum diameter of obstacles and the bearing life when a not filtered fluoro-lubricating oil is used.
Figure 10:
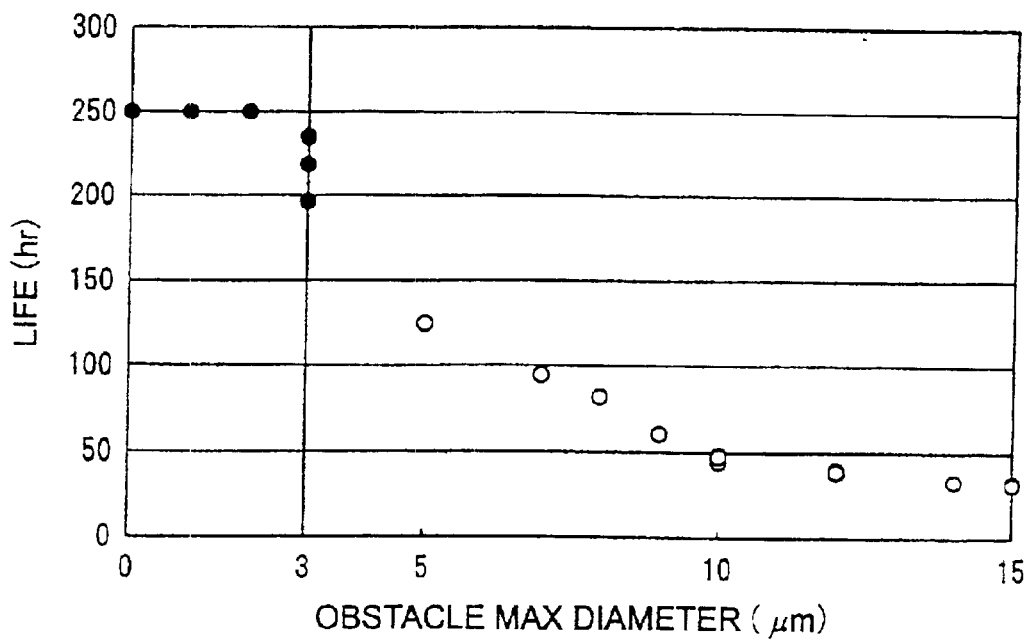
FIG. 10 is an explanatory graph illustrating a relation between the maximum diameter of obstacles and the bearing life when a filtered fluoro-lubricating oil is used.

Table 11 and Table 12 show the results of the test. FIG. 9 shows a correlation between the maximum diameter of the obstacles and the bearing life in a case where not filtered fluoro-lubricating oil was used and FIG. 10 shows a correlation between the maximum diameter of the obstacles and the bearing life in a case where filtered fluoro-lubricating oil was used.

TABLE 11

| | Abrasive grain type in barrel treatment[1] | Cloth treatment time (sec) | Obstacles Number (N) | Obstacles Max. dia (μm) | Bearing life (hr) | Weible slope |
|---|---|---|---|---|---|---|
| Example | | | | | | |
| 201A | No treatment | 60 | 3 | 3 | 182 | 3.5 |
| 201B | | | | | 219 | 16.8 |
| Example | | | | | | |
| 202A | no treatment | 120 | 2 | 1 | >250 | ∞[2] |
| 203B | | | | | >250 | ∞ |
| Example | | | | | | |
| 203A | no treatment | 180 | 0 | — | >250 | ∞ |
| 203B | | | | | >250 | ∞ |
| Example | | | | | | |
| 204A | d | 0 | 25 | 3 | 147 | 2.9 |
| 204 | | | | | 197 | 14.6 |
| Example | | | | | | |
| 205A | d | 30 | 18 | 3 | 171 | 3.5 |
| 205B | | | | | 235 | 18.3 |
| Example | | | | | | |
| 206A | d | 60 | 5 | 2 | 198 | 4.4 |
| 206B | | | | | >250 | ∞ |
| Example | | | | | | |
| 207A | d | 120 | 4 | 1 | >250 | ∞ |
| 207B | | | | | >250 | ∞ |

TABLE 11-continued

| | Abrasive grain type in barrel treatment[1] | Cloth treatment time (sec) | Obstacles Number (N) | Obstacles Max. dia (μm) | Bearing life (hr) | Weible slope |
|---|---|---|---|---|---|---|
| Example | | | | | | |
| 208A | d | 180 | 2 | 1 | >250 | ∞ |
| 208B | | | | | >250 | ∞ |

[1]a: Alundum #100,
b: Alundum #150
c: Alumina #1500–2000
d: Alumina #4000–6000
[2]Infinite

TABLE 12

| | Abrasive grain type in barrel treatment[1] | Cloth treatment time (sec) | Obstacles Number (N) | Obstacles Max. dia (μm) | Bearing life (hr) | Weible slope |
|---|---|---|---|---|---|---|
| Comp. Ex. 201A | no treatment | 0 | 8 | 8 | 75 | 2.4 |
| 201B | | | | | 83 | 3.2 |
| Comp. Ex. 202A | no treatment | 30 | 4 | 5 | 95 | 2.7 |
| 202B | | | | | 125 | 3.8 |
| Comp. Ex. 203A | c | 0 | 21 | 12 | 36 | 1.8 |
| 203B | | | | | 38 | 2.3 |
| Comp. Ex. 204A | c | 30 | 15 | 10 | 46 | 2.1 |
| 204B | | | | | 50 | 2.5 |
| Comp. Ex. 205A | c | 60 | 12 | 7 | 83 | 2.5 |
| 205B | | | | | 95 | 3.1 |
| Comp. Ex. 206A | b | 0 | 18 | 15 | 30 | 2.2 |
| 206B | | | | | 33 | 2.3 |
| Comp. Ex. 207A | b | 30 | 13 | 12 | 37 | 1.8 |
| 207B | | | | | 42 | 2,4 |
| Comp. Ex. 208A | b | 60 | 11 | 10 | 42 | 1.9 |
| 208B | | | | | 45 | 2.4 |
| Comp. Ex. 209A | b | 120 | 8 | 9 | 55 | 2.3 |
| 209B | | | | | 61 | 2.6 |
| Comp. Ex. 210A | a | 0 | 18 | 15 | 23 | 1.4 |
| 210B | | | | | 31 | 2.1 |
| Comp. Ex. 211A | a | 30 | 15 | 14 | 27 | 1.6 |
| 211B | | | | | 34 | 2.2 |
| Comp. Ex. 212A | a | 60 | 12 | 12 | 36 | 2.1 |
| 212B | | | | | 40 | 3.0 |
| Comp. Ex. 213A | a | 120 | 10 | 10 | 41 | 2.2 |
| 213B | | | | | 47 | 3.1 |

[1]a: Alundum # 100, b: Alundum # 150
c: Alumina # 1500–2000 d: Alumina # 4000–6000
[2]infinite Obstacles remained on the raceway surface were measured for the number and the size by observing the raceway surface under an electronmicroscope (manufactured by Nippon Denshi Co). In the table, values for the maximum mean diameter (mean value for the major axis and the minor axis) among the observed obstacles are indicated in the column for the maximum diameter.

Further the life of the thrust ball bearings filled with the fluoro-lubricating oil was evaluated by the life time and the weible slope. In each of the examples and the comparative examples, A represents the result of the test for the bearings filled with the not filtered fluoro-lubricating oil and B shows the result of the test for the bearings filled with the filtered fluoro-lubricating oil. Further, in the bearing life shown in Table 11 and Table 12, those indicated as (>250) indicate that peeling fracture or wear did not occur at all even when the total number of bearings tested exceeds the calculated life (250 hrs) and the test was terminated.

As described in Table 11 and Table 12, since the number of obstacles remained is decreased as the time for the cloth treatment is longer, it is supposed that the obstacles are removed by the cloth treatment. Then, the bearing life was improved by the cloth treatment and the value for the weible slope was also satisfactory.

Further, since the abrasive grains per se are deposited on the raceway surface by the barrel treatment, the number of the obstacles remained is rather increased. In a case of using the super gloss polishing wheel (Examples 204A –208A), since the abrasive grains were small and the maximum diameter thereof, if deposited, is 3 $\mu$m or less, the bearing has long life. In a case of conducting the barrel treatment using other abrasive grains of large diameter (Comparative Example 203A–213A), since the maximum diameter of the obstacles is in excessive of 3 $\mu$m, the bearing life is not sufficient even if the cloth treatment is applied together.

Accordingly, when obstacles such as abrasive grains having a mean diameter in excess of 3 $\mu$m are not remained on the raceway surface of the inner ring and the outer ring, the bearing life is improved. Further, for obtaining stable and long life, it is desirable that obstacles having a mean diameter in excess of 2 $\mu$m are not remained.

On the other hand, taking notice on the filtration with the fluoro-lubricating oil, filtration apparently provides long bearing life. Further, since the value for the weible slope is increased, it can be seen that bearings having stable life are manufactured (stable quality) (Examples 201A, B to 2–8A. B). However, if large obstacles are remained, the life tends to be determined by the large obstacles. Accordingly, while some effect was observed for Comparative Example 202A, B with relatively small maximum diameter, the size of the obstacles is predominant in other cases (Comparative Example 201A, B, 203A, B to 213A, B), so that there was no significant effect by filtration. That is, when the filtration is conducted, the bearing life is longer also in a case where obstacles such as abrasive grains having a mean diameter in excess of 3 $\mu$m are not remained on the raceway surface of the inner ring and the outer ring.

As described above, by removing the obstacles of abrasive grains remained on the raceway surface of the inner ring and the outer ring with the barrel treatment or cloth treatment, peeling wear or peeling flaking are suppressed to improve the bearing life. Further, use of the filtered fluoro-lubricating oil can provide an effect of further improving the life.

This embodiment shows an example of the present invention but the invention is not restricted only to this embodiment. For example, while description have been made in this embodiment, taking the thrust ball bearings as the example of the rolling bearing for explanation, the rolling bearing according to the present invention is applicable to various other kinds of rolling bearings. For example, they include other types of thrust rolling bearings such as thrust roller bearing or radial type rolling bearings. Examples of the radial type rolling bearing can include, for example, roller bearing such as cylindrical roller bearing, self-aligning roller bearing, tapered roller bearing and ball bearings such as deep groove ball bearing and angular ball bearing. Then, when the full complement angular ball bearings are used as in the fifth embodiment and, further, the contact angle is made from 10 to 45°, further preferably, from 15 to 30°, the contact pressure between the rolling element and the rolling bearing ring can be lowered to decrease the wear, so that the further longer life can be expected. Further, as described above, when the definition in the first to fourth embodiment is applied, further longer life is possible.

Then, a seventh embodiment of the rolling bearing according to the present invention is to be described. Like that the first embodiment described above, this embodiment is also based on the rolling bearing used in reduced pressure including vacuum such as in vacuum pump apparatus and lubricated with fluoro-lubricating oil. Then, in this embodiment, a cage for holding the balls is formed with an advanced resin material into a circular shape instead of the deep groove ball bearing or the angular ball bearing used in the respective the embodiments described above.

Figure 11:
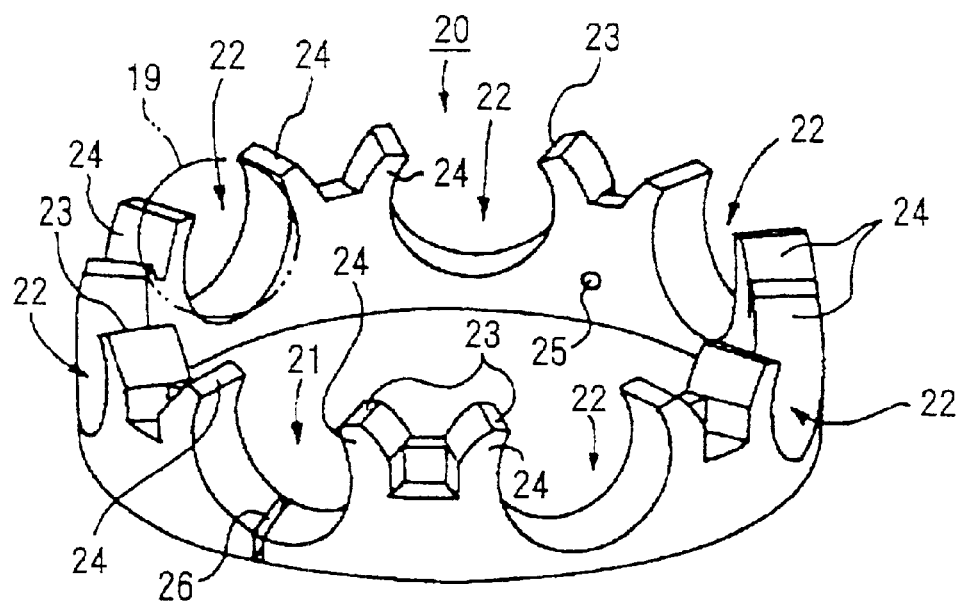
FIG. 11 is a perspective view illustrating an embodiment of a cage adopted for the rolling bearing according to the present invention.
Figure 12:
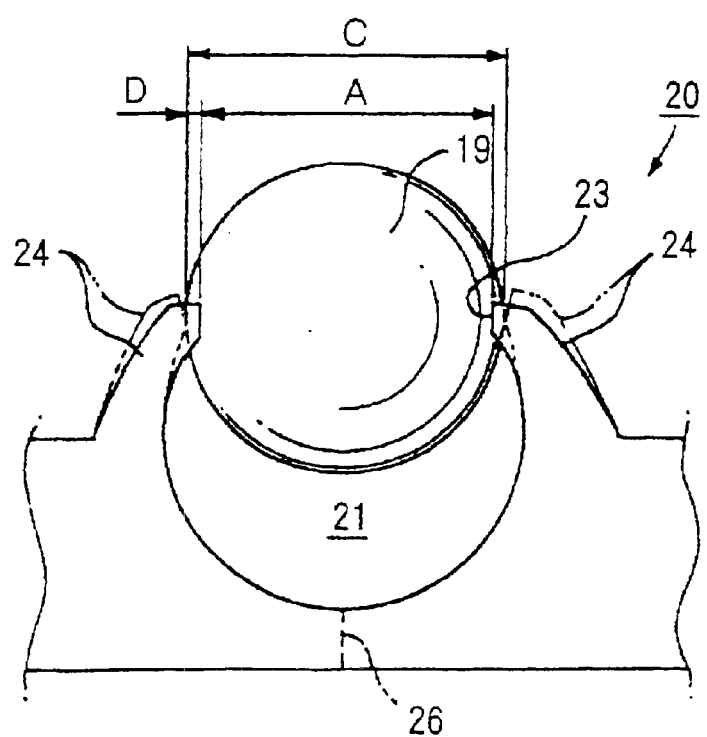
FIG. 12 is a side elevational view for a main portion illustrating a pocket having a weld line in a cage used for the rolling bearing shown in FIG. 11.
Figure 13:
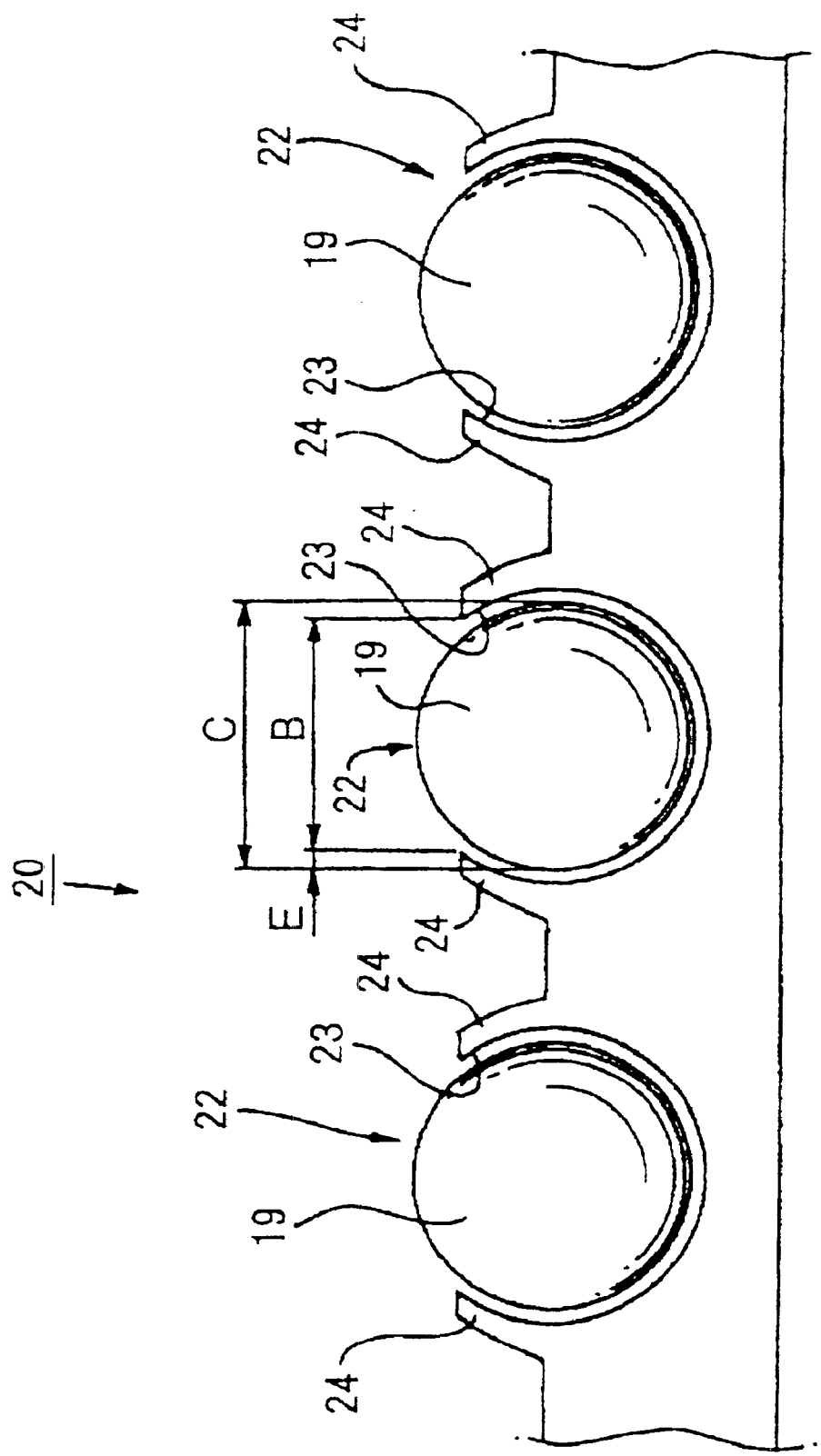
FIG. 13 is a side elevational view for a main portion illustrating another pocket in a cage used for the rolling bearing shown in FIG. 11.

FIG. 11 is a perspective view illustrating an embodiment of a cage adopted in the rolling bearing according to the present invention, FIG. 12 is a side elevational view for a main portion of a pocket having a weld line in a cage for use in the rolling bearing in FIG. 11, FIG. 13 is a side elevational view for a main portion illustrating other pocket of a cage for use in the rolling bearing shown in FIG. 11. Further, FIG. 4 is a plan view for explaining a test method of a tensile strength of the cage for use in the rolling bearing.

Referring to FIG. 11 to FIG. 13, in a cage 20 for use in rolling bearing, a reinforcing material such as glass fibers is incorporated by about 5 to 15% by weight ratio to an advanced resin material such as polyphenylene sulfide (PPS) resin and formed into a circular shape without applying annealing.

In the cage 20 for use in the rolling bearing, pockets 21, 22 are disposed in plurality (by the number of seven in FIG. 11) at a predetermined distance in the circumferential direction each being opened upward in FIG. 11. Each of the pockets 21, 22 contains a rolling element 19 of the rolling bearing (not illustrated) through an opening 23 and holds the same rotatably.

Each of the pockets 21 and 22 has a pair of fingers 24, and each rolling element 19 is assembled through the opening 23 into each of the pockets 21 and 22 so as to circumferentially expanding the finger 24 for each of the pockets 21 and 22.

By the injection molding of the advanced resin material, a weld line 26 is formed at the junction of the molten resin injected from gates 25, and the size A for the opening of the pocket 21 having the weld line 26 (inter-finger size) (FIG. 12) is set to a value larger than 93% of the rolling element diameter C (for example 93 to 110%). Further, the opening size B for each of other pockets 22 is set to a value for 80 to 93% of the rolling element diameter C. Accordingly, the clamping area D by the finger 24 of the pocket 21 with the weld line 26 (FIG. 12) is smaller than the clamping size E (FIG. 13) by the finger 24 of each of the other pocket 22.

The operation of this embodiments are to be described below. In the cage 20 for use in the rolling bearing, since the clamping size D by the finger 24 of the pocket 21 with the weld line 26 is smaller than the clamping size E by the finger 24 of each of other pockets 22, when the rolling element 19 is assembled to each of the pockets 21 and 22, the force exerted when the finger 24 of the pocket 21 having the weld line 26 is expanded in the circumferential direction by the rolling element 19 can be made smaller compared with that for the finger 24 of each of other pockets 22.

Accordingly, the rolling element 19 is assembled smoothly with no excessive force being exerted to the finger 24 in the pocket 21 with the weld line 26, so that neither crack nor breakage occurs to the portion of the weld line 26 (bottom of the pocket 21). Further, in each of the other pockets 22, both easiness for assembling the rolling element into each of the pockets 22 and less drop off of the rolling element 19 assembled into each pocket 22 are ensured at the same time.

When the size A for the opening of the pocket 21 (inter-finger size) having the weld line 26 is set to 100% or more, since the clamping size D by the finger 24 is eliminated, the rolling element 10 can be assembled further smoothly.

Then, a tensile test was conducted for the cage 20 for use in rolling bearing in this embodiment while varying the various conditions in accordance with the following method.

Figure 14:
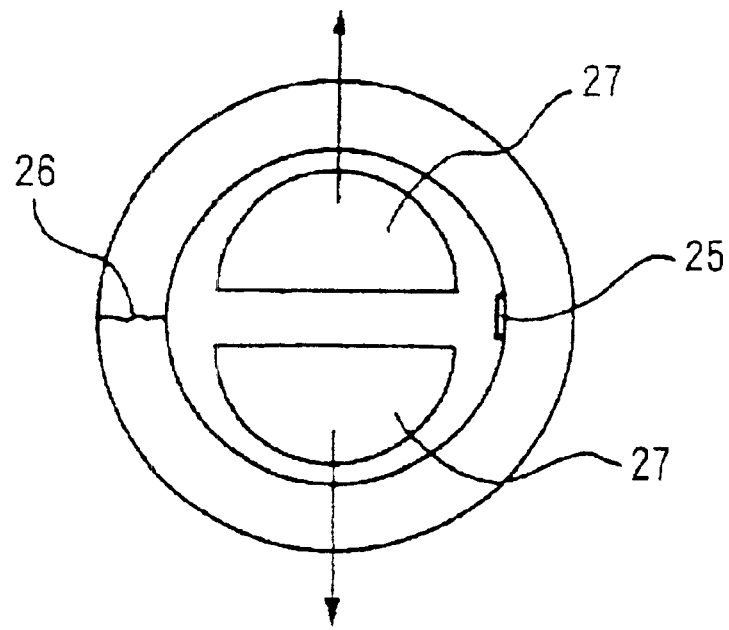
FIG. 14 is an explanatory view for the test method of a tensile strength of a cage used for a rolling bearing.
Figure 15:
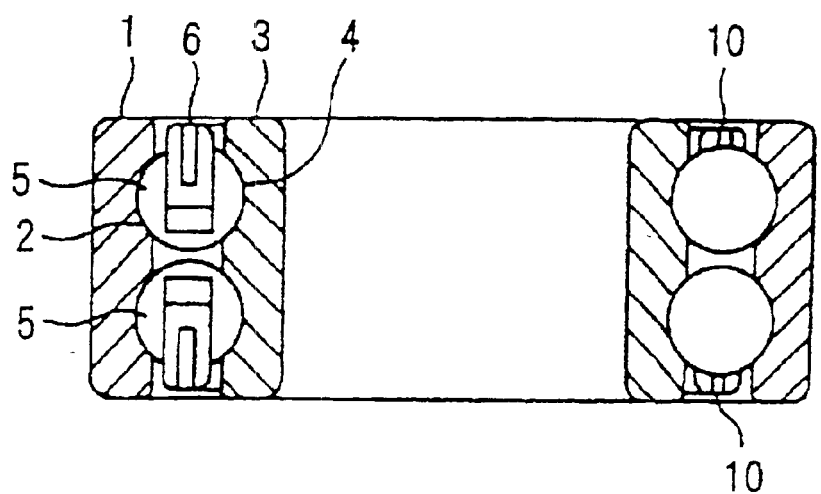
FIG. 15 is a longitudinal cross sectional view illustrating an embodiment of a rolling bearing according to the present invention.
Figure 16:
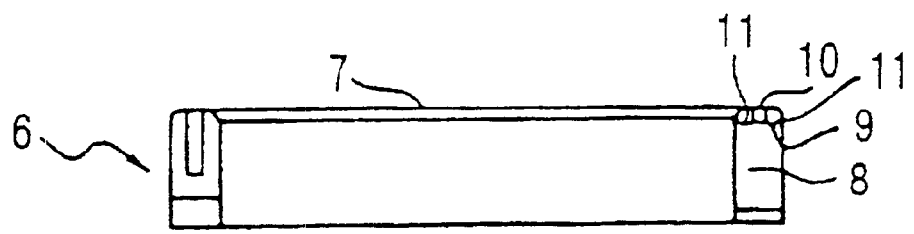
FIG. 16 is a cross sectional view of a cage for a rolling bearing shown in FIG. 15.
Figure 17:
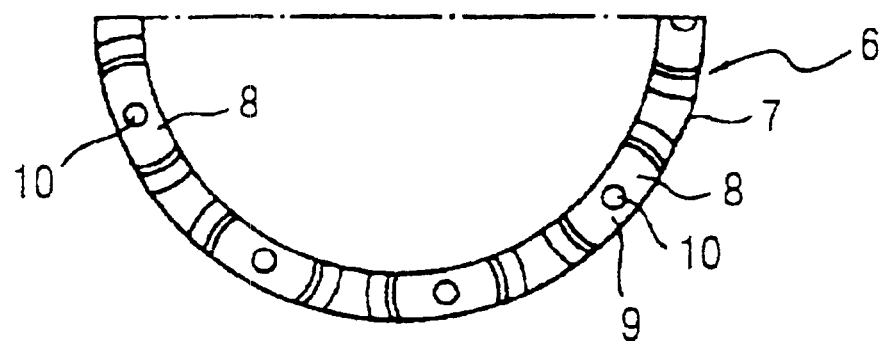
FIG. 17 is a plane view illustrating a portion of a cage for the rolling bearing shown in FIG. 15.
Figure 18:
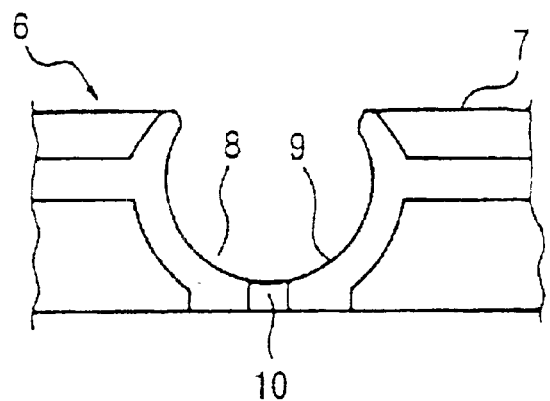
FIG. 18 is a cross sectional view illustrating a portion of a cage.
Figure 19:
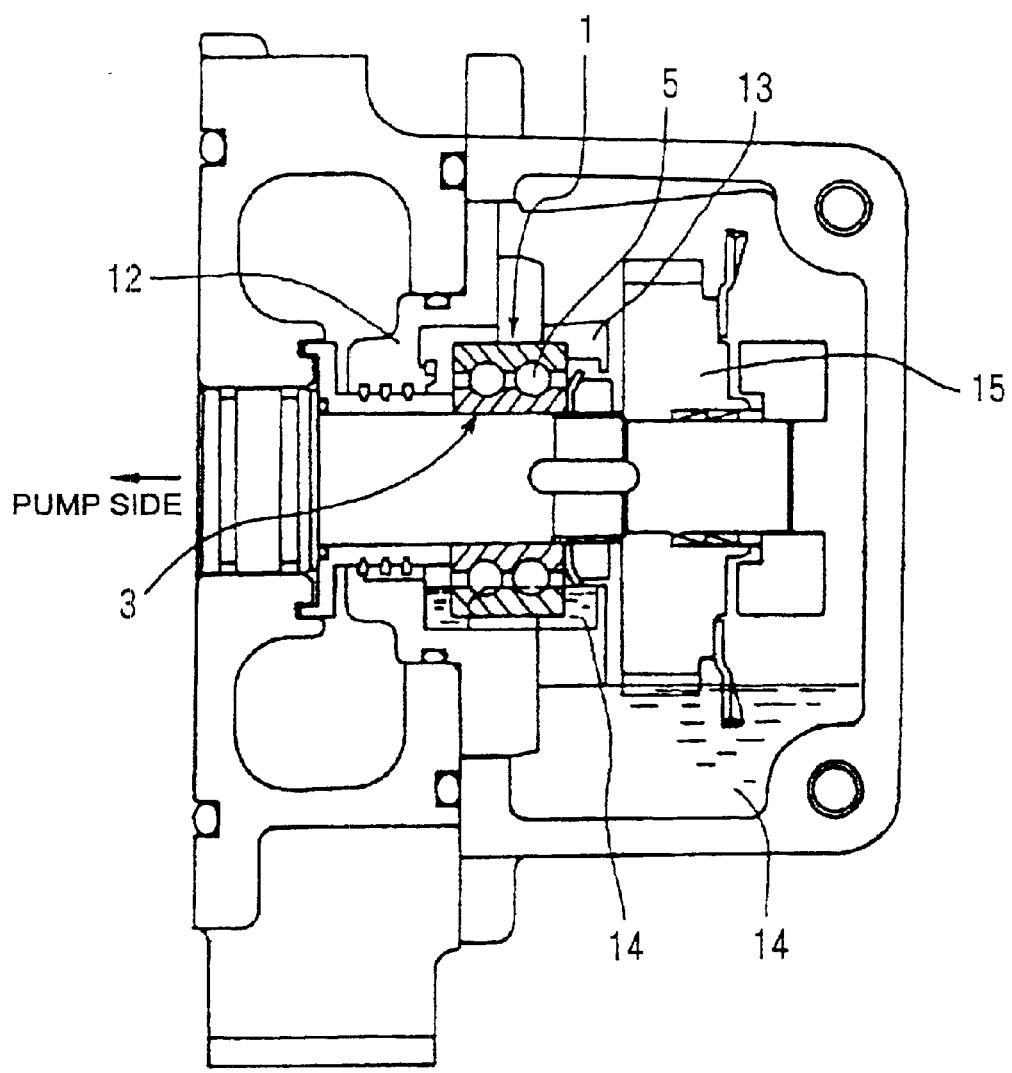
FIG. 19 is a schematic constitutional view of a vacuum pump.
Figure 20:
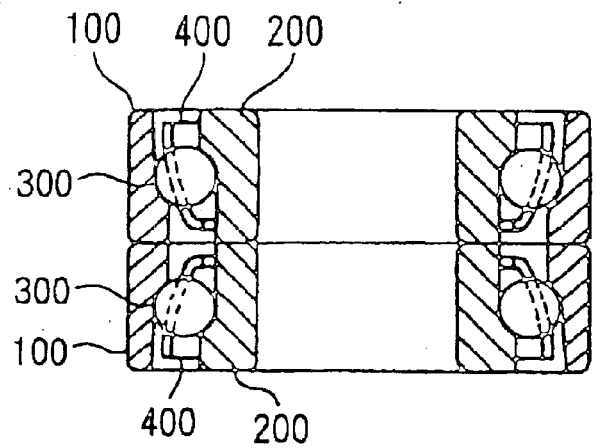
FIG. 20 is a vertical cross sectional view of an existent duplex angular ball bearing.
Figure 21:
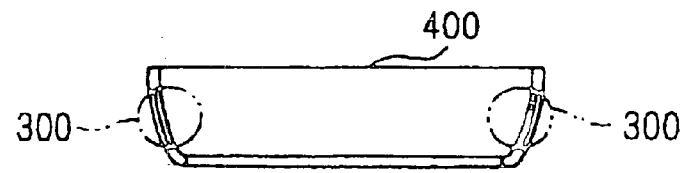
FIG. 21 is a cross sectional view of a cage for the angular ball bearing shown in FIG. 20.
Figure 22:
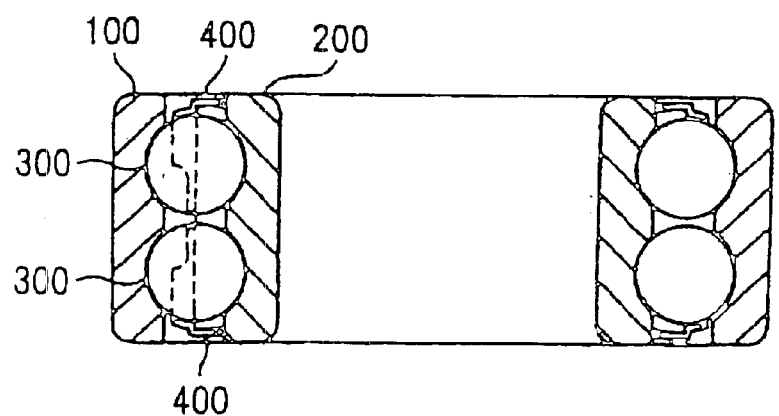
FIG. 22 is a vertical cross sectional view of an existent double row angular ball bearing.
Figure 23:
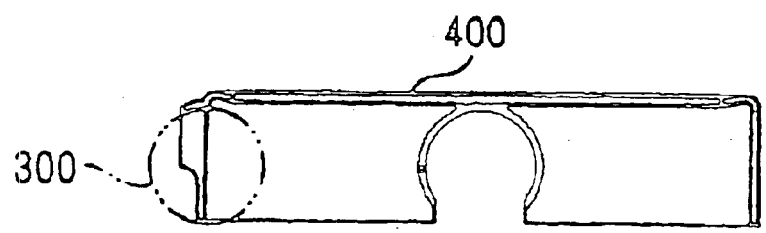
FIG. 23 is a vertical cross sectional view of a cage for the angular ball bearing shown in FIG. 22.
Figure 24:
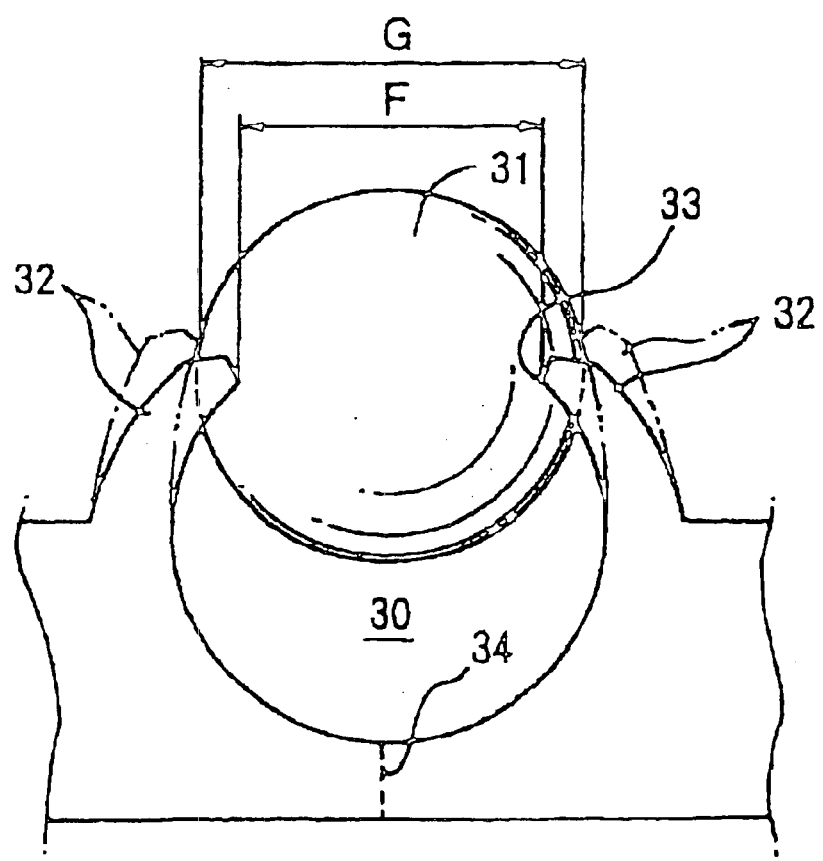
FIG. 24 is a side elevational view for a main portion illustrating a pocket having a weld line of a cage for an existent rolling bearing.

That is, referring to FIG. 14, in a state of situating the cage for use in the rolling bearing such that the gate 25 of the cage for use in the rolling bearing is on the right in FIG. 14, while the weld line 26 is on the left in FIG. 14, a pair of die members 27 are disposed to an inner diametrical portion of the cage. Each of the die members 27 is formed into a semi-circular shape and has a somewhat smaller diameter than the inner diameter of the cage. Then, each of the die members 27 was pulled in the directions opposite to each other (in the vertical direction in FIG. 14) till the cage for use in the rolling bearing was fractured to measure the load upon breakage.

Various conditions and the results are shown in Table 13. The number means herein the number of the cage. All breakage occurred at the portion of the weld line 26. Further, in Table 13, all the value for the load upon breakage are mean values.

TABLE 13

| Bearing No. | Number | Resin material | CF content ratio | Annealing | Load on breakage (kgf) |
|---|---|---|---|---|---|
| 6205(Comp. Example) | 4 | PPS | 20% | no | 16 |
| 6205(Example) | 4 | PPS | 10% | no | 45 |
| 6206(Comp. Example) | 3 | PPS | 20% | no | 32 |
| 6206(Comp. Example) | 3 | PPS | 20% | applied | 27 |
| 6206(Example) | 4 | PPS | 10% | no | 55 |

As can be understood from Table 13, those with the content ratio of the reinforcing materials such as glass fibers as 20% by weight show smaller load upon breakage compared with those with the content ratio of reinforcing materials as 10% by weight. Further, those applied with annealing showed smaller load upon breakage compared with the those applied with no annealing.

Also, the cage 20 for use in roller bearing according to the embodiment with varying the various conditions are assembled in the roller bearing, and we investigated whether the cracks are occurred on cage assembled.

The various conditions and the results are shown in FIG. 4. The all of the cracks are occurred on the portion of weld line 26.

TABLE 14

| Bearing No. | Number | Resin material | CF content ratio | Annealing | Occurrence of crack upon cage insertion to bearing |
|---|---|---|---|---|---|
| 6205(Comp. Example) | 10 | PPS | 20% | no | cracked |

TABLE 14-continued

| Bearing No. | Number | Resin material | CF content ratio | Annealing | Occurrence of crack upon cage insertion to bearing |
|---|---|---|---|---|---|
| 6205(Example) | 10 | PPS | 10% | no | not cracked |
| 6206(Comp. Example) | 10 | PPS | 20% | no | cracked |
| 6206(Comp. Example) | 10 | PPS | 20% | applied | cracked |
| 6206(Example) | 10 | PPS | 10% | no | not cracked |

As can be understood from Table 14, when the content ratio of the reinforcing materials such as glass fiber is set to 20% by weight, cracks occurred to the pocket having the weld line 26 irrespective of the presence or absence of annealing treatment.

As described above, in accordance with this embodiment, the size A for the opening of the pocket 21 having the weld line 26 is set to a value larger than 93% for the rolling element diameter C (for example, 93 to 110%), and the size B for the opening of each of other pockets 22 is set to a value of 80 to 93% for the rolling element diameter C. Accordingly, drop off of the cage 20 for use in the rolling bearing from the rolling bearing can be prevented reliably and occurrence of cracks or breakage at the bottom of the pocket 21 having the weld line 26 can be prevented reliably upon assembling of the rolling element 19 to each of the pockets 21 and 22.

Further, the reinforcing materials such as glass fiber was incorporated by about 5 to 15% by weight ratio to the advanced resin material such as polyphenylene sulfide (PPS) and the annealing was not applied. Accordingly, strength at the portion of the weld line 26 could be ensured together with excellent corrosion resistance, and occurrence of cracks or breakage at the bottom of the pocket 21 having the weld line 26 can be prevented more reliably.

Further, the cage 20 for use in the rolling bearing according to this embodiment is applicable to any of rolling bearings having rolling elements and, for example, it is applicable to cylindrical thrust bearings, tapered roller bearings and self-aligning roller bearings.

Then, an eighth embodiment of the rolling bearing according to the present invention is to be described. Like that the first embodiment, also this embodiment is based on the rolling bearing used in reduced pressure including vacuum such as in vacuum pump apparatus and lubricated with fluoro-lubricating oil. Then, in this embodiment, double row angular ball bearings are used instead of the single row deep groove ball bearings used in the respective embodiments described above.

In FIG. 15–FIG. 19, an outer ring 1, an inner ring 3, rolling elements (ball) 5, a cage 6, a bearing case 12, a bearing cover 13, an oil (fluoro-oil) 14 and a timing gear 15 are shown. That is, there is no restriction regarding the present invention but an oil bath lubrication with fluoro-oil is adopted in this embodiment in view of maintaining the vacuum degree.

Further, in the present invention, the outer ring 1, the inner ring 3 and the rolling element 5 are not particularly restricted to the illustrated embodiment but may be modified optionally into well-known forms, and one or both of the material for the cage 6 and the shape of the cage 6 is defined.

Improvement in the Material of the Cage:

The rolling bearing in this embodiment has the rolling elements 5 between the outer ring 1 and the inner ring 3 and a PTFE (polytetrafluoroethylene) resin material or a PPS (polyphenyl sulfide) resin material is used as the material for the cage 6 rotatably holding the rolling elements 5.

The cage 6 is a well-known snap cage in which pockets 8 for rotatably holding the rolling elements 5 are disposed at a plurality of circumferential positions of the circular main portion 7 formed of a synthetic resin material, to which well known structures are applicable except for the definition of the material as described above. This embodiment has the shape of the snap cage as described above but it can cope with resin cages of other shapes.

By defining the material for the cage 6 as in this embodiment, since it has self lubricating characteristic compared with the cage made of steel and has small friction coefficient, abrasion powder of the cage is less formed. Further, even if the abrasion powder should be formed, it does not deteriorate the lubricating agent and, further, causes no indentations to the raceway surface thereby enabling to extend the bearing life.

Improvement in the Shape of the Cage:

The bearing life can be extended also by configurating the cage 6 as in the following shape. A hole 10 (through hole) of a desired shape is perforated at the bottom 9 of the pocket 8, a lubricating agent is intruded through the hole 10 to improve the lubricating performance between the cage 6 and the rolling elements 5 thereby enabling to extend the bearing life. There are no particular restrictions for the size of the hole 10 (hole diameter), shape or the number of the holes (one or plurality of holes for one pocket) and optional design is possible within the scope of the present invention.

Further, chamfering 11 is applied to the inner and outer diametrical sides for the surface of the cage pocket 8 to facilitate intrusion of the lubricating agent thereby improving the lubricating performance between the cage 6 and the rolling elements 5. Further, an angle of inclination for the chamfering 11 is not particularly limited but selected optionally within the scope of the present invention.

Further, well-known structures are applicable to the shape of the cage 6 with no restrictions excepting for providing the through hole 10 and the chamfering 11 described above.

Improvement in the Material and the Shape of the Cage:

Further, it is also within the scope of the present invention to make the material for the cage 6 with the PTFE (polytetrafluoroethylene) resin material or PPS (polyphenylene sulfide) resin material and to provide the through hole 10 for the pocket bottom 9 as described above and provide the chamfering 11 on the inner and the outer diametrical sides on the surface of the pocket 8.

Although not restricted in the present invention, the bearing life can further be extended by adopting the following specifications in a case of using balls for the rolling element 5.

Generally, the radial size for the grooves of the inner and outer ring raceway surfaces 2, 4 is adapted as 50.5 to 60% for the ball diameter and it is desirable to adopt 52 to 54% for the inner ring and 53 to 56% for the outer ring in view of the PV value (P: contact pressure, V: sliding speed).

It has been known that the bearing life is made longer as the radial size of the groove is smaller in view of the relation with the contact pressure but, if it is too small, the contact ellipse with the raceway surface becomes excessively large tending to cause sliding and sometimes shorten the bearing life by sliding wear. Accordingly, even if the bearing life is shortened by increasing the contact pressure, the bearing life is extended relatively by lowering the sliding speed.

Further, the bearing life can be extended by adopting the carbonitrided bearing material or nitrided bearing material having a long life even under lubricating conditions with incorporation of dusts.

While the descriptions have been made in this embodiment only to the double row angular ball bearing used for vacuum pumps, the present invention is not restricted only thereto but is applicable generally to well known rolling bearings such as duplex angular ball bearings. Further, it may be applicable also to rolling bearings used for other applications except for the vacuum pump.

Further, if this embodiment is defined with the seventh embodiment in which the size for the opening of the pocket having the weld line is set to a value of 93% or more for the diameter of the and the size for the opening for each of other pockets to a value of 80 to 93% for the diameter of the rolling element, respectively, it can provide a combined effect capable of reliably preventing occurrence of cracks or breakage to the bottom of the pocket having the weld line upon assembling of the rolling element to each of the pockets while reliably preventing drop off the cage for use in the rolling bearing from the rolling bearing.

Each of the embodiments has been described as corresponding to each of the inventions not depending on each other, but it will be apparent from the foregoing descriptions that the bearing characteristics can further be improved by combining each of the inventions, that is, each of the embodiments.

That is, the present invention is based on that it concerns
① a rolling bearing used in a reduced pressure atmosphere such as in vacuum pump apparatus, and
② a rolling bearing for supporting heat rolls and the like in the fixing portion of business machines. Fluoro-lubricant is used in both of the cases in view of corrosion resistance and less evaporative amount in ① and heat resistance and less evaporation amount and chemical stability for the use in high temperature circumstance in ②.

By the way, although the fluoro-lubricant has an advantage being less evaporative and more chemically stable compared with the mineral oil type lubricant, it involves problems in that the lubrication is insufficient since the specific gravity is higher and the wettability is poor (insufficient formation of oil membrane), the lubricant can not easily prevail through narrow gaps (for example between the pocket of the cage and the rolling element) and, accordingly, peeling damages such as peeling wear or peeling flaking tends to occur on the raceway surface of the bearing ring or the rolling element to lower the life. In addition, it has been found that the peeling damages tend to occur easily on the rolling surface of the rolling element or the pocket portion of the cage (made by steel) selectively.

Accordingly, for coping with the foregoings, the present invention comprise the following embodiment and provides a long life rolling bearing in a working circumstance, particularly, in ① and ② described above.

1. Particularly, in the application use for ①, angular type ball bearings having a contact angle are often used. Then, the contact angle contact is defined as 10 to 45° for preventing the peeling damages, that is, for suppressing spin sliding, the endurance life is improved by adopting the full ball type in order to lower the contact pressure between the inner and outer rings and the balls (also improving the load capacity). Further, the cage undergoing the peeling damages selectively is saved and, further, the rolling elements are preferably, made of ceramics to provide a rolling bearing effective for extending the life (claim 1, fifth embodiment).

2. Taking notice on that the rolling element suffers from more wear if the surface roughness of the rolling element is excessively high, on the condition that the surface roughness of the raceway surface of the inner ring and the outer ring is 0.05 µm Ra or less, the roughness ratio of both of them is made 6 or less to provide long life rolling bearing.

3. Cohesion wear is prevented by covering the rolling surface of the rolling element that selectively surfers from peeling damages with a dense oxide film to disperse hard and fine carbides and a material with addition of 7 to 27% by weight of Cr as an element for forming passivation films and carbides at least to the rolling element in order to prevent corrosion due to the fluorine gas caused by decomposition of the fluoro-lubricant due to high temperature at locally temperature elevated portion (local contact) to provide a long life rolling bearing.

4. Wear of the rolling element is reduced by making the surface hardness of the rolling surface of the rolling element higher than the surface hardness of the raceway surface of the inner and the outer rings (including formation of films such as of Ni—P, Cr, TiN), to provide a long life rolling bearing.

5. The rolling element is provided at the rolling surface with the nitride layer making the surface roughness to 0.005 µm Ra or less and the hardness to Hv 900 or more, or is constituted with chemically stable oxide ceramics, to provide long life rolling bearing.

6. Since the fluoro-lubricant has higher specific gravity and poor wettability compared with mineral oil lubricant, it tends to suffer from the effect by the presence of obstacles such as abrasive grains, the mean diameter of the remained obstacles is reduced to 3 µm or less by barrel treatment, cloth treatment or filtration of lubricant, thereby eliminating the cause of the peeling damages, to provide a long life rolling bearing.

7. For improving the corrosion resistance (due to the effect of the fluoro-lubricant or the like) in the application use of supporting bearing in vacuum pumps, the cage tending to suffer from peeling damages is made of resins such as PPS, PEEK or PBT. While injection molding is adopted for the manufacturing method, since cracks tend to be formed by weld lines, the opening for the portion is made wider than the opening portion for other pocket portions and the opening for other pocket is narrowed in order to prevent drop off of the rolling element. The life of the cage is extended by preventing cracks upon forced drawing of the cage after the injection molding and the assembling of the rolling bearing, thereby reducing the cost of the rolling bearing in the application use for the vacuum pump and preventing the damages in the weld portion of the cage, to provide a long life rolling bearing.

8. In the cage using the fluoro-lubricant, materials of high corrosion resistance and usable at high temperature such as PTFE or PPS are used. Since the fluoro-lubricant is less prevailing through the gap between the cage and the rolling element because of poor wettability, a through hole is formed in the pocket bottom or chamfer is applied to inner and outer diametrical surfaces of the pocket surface for improving this, thereby preventing peeling damages to the cage, to provide a long life rolling bearing.

The embodiments 1 to 8 described above of the present invention not depending of each other are duplicated with the descriptions in the column of means for solving the subject but each of them is disclosed as the means for solving the problems inherent to the application use that require the use of the fluoro-lubricant and they provide a synergistic effect and the purpose of the present invention, alone or in combination of plurality of them and they particularly enable to prevent peeling damage and provide long life rolling bearing.

INDUSTRIAL APPLICABILITY

As has been described above, according to the rolling bearing of claim 1 in the present invention, since the full complement angular ball bearing is used and the contact angle thereof is made 10° or more and 45° or less, the number of balls is increased thereby enabling to lower the contact pressure between the inner and the outer rings and the balls, as well as reduce the degree of spin sliding due to fluctuating load, so that the wear can be reduced by the synergistic effects of them to extend the life even under the condition of fluoric lubrication.

Further, according to the rolling bearing of claim 2 in the present invention, since the contact angle of the full complement angular ball bearing is made 15° or more and 30° or less, the degree of spin sliding due to fluctuating load can further be decreased to promote the extension of the life under the condition of fluoric lubrication.

Further, according to the rolling bearing of claim 3 in the present invention, since the surface roughness of the inner ring and the outer ring is made to 0.05 µm Ra or less and the roughness ratio of them relative to the rolling element is made to 6 or less, the contact wear under the condition with fluoric lubrication can be suppressed to attain a long life.

Further, according to the rolling bearing of claim 4 in the present invention, since at least the rolling element is formed by an alloy steel with the Cr content of 7% by weight or more and 27% by weight or less and fine carbides are uniformly dispersed on the surface thereof, even when the thickness of the lubrication film is reduced to cause direct contact between the rolling surface of the rolling element and raceway surface of the bearing ring, occurrence of cohesion wear can be prevented and even when the contact point between the rolling element and the bearing ring is heated to an extremely high temperature locally, corrosion on the surface of the rolling element and the bearing ring can be suppressed, so that the life can be extended under the condition of fluoric lubrication.

Further, according to the rolling bearing of claim 5 in the present invention, since at least the rolling element is formed of oxide ceramics or a dense nitride layer is provided to the surface of the rolling element thereby making the surface roughness of the rolling element to 0.005 µm Ra or less and the hardness to Hv 900 or more, even when it is heated an excessively high temperature locally, reaction with fluoro-lubricating oil is extremely reduced to suppress the decomposition and improve the lubricity of the fluoro-lubricating oil and, in addition, peeling can be prevented to suppress roughened wear, so that life can be extended under the condition with fluoric lubrication.

Further, according to the rolling bearing of claim 6 in the present invention, since obstacles with the mean diameter in excess of 3 µm are not present at least on the raceway surfaces of the outer ring and the inner ring, peeling wear or peeling flaking caused by intention flaws can be suppressed to extend the life under the condition with fluoric lubrication.

Further, according to the rolling bearing of claim 7 in the present invention, since a film of a hardness higher than that of the raceway surface of the outer ring and the inner ring is coated at least on the surface of the rolling element, decomposition of the fluoro-lubricating oil can be suppressed to improve the lubricity and the wear of the rolling element can be suppressed, long life can be attained under the lubricating condition with the fluoric lubrication.

Further, according to the rolling bearing of claim 8 in the present invention, since the size for the opening of the pocket having the weld line among the rolling element pockets of the cage formed with an advanced resin material into a circular shape is made to a value of 93% or more for the diameter of the rolling element, and the size for the opening of other at least to pockets are made to a value of 80% or more and 93% or less for the diameter of the rolling element, cracks or breakage in the bottom of the pocket having the weld line can be reliably prevented upon assembling the rolling element to each of the pocket while reliably preventing the drop off of the cage from the rolling bearing.

Further, according to the rolling bearing of claim 9 in the present invention, since the cage is constituted with the PTFE resin material or the PPS resin materials, or chamfer is formed to the inner or the outer diametrical sides of the pocket and the through hole is formed in the pocket bottom, the abrasion powder of the cage is less caused, the lubricant is not deteriorated, indentations are less caused to the raceway surface and the lubrication performance can be improved, so that long life can be attained under the condition with fluoric lubrication.

Further, according to the rolling bearing of claim 10 in the present invention, since the size for the opening of the pocket having the weld line among the rolling element pockets of the cage formed with an advanced resin material into a circular shape is made to a value of 93% or more for the diameter of the rolling element, and the size for the opening of other at least two or more pockets are made to a value of 80% or more and 93% or less for the diameter of the rolling element, and since the cage is constituted with the PTFE resin material or the PPS resin materials, or chamfer is formed to the inner or the outer diametrical sides of the pocket and the through hole is formed in the pocket bottom, cracks or breakage in the bottom of the pocket having the weld line can be reliably prevented upon assembling the rolling element to each of the pocket while reliably preventing the drop off of the cage from the rolling bearing, and the abrasion powder of the cage is less caused, the lubricant is not deteriorated, indentations are less caused to the raceway surface and the lubrication performance can be improved, so that long life can be attained under the condition with fluoric lubrication.

What is claimed is:

1. A rolling bearing comprising at least an outer ring having an outer ring raceway, an inner ring having an inner ring raceway, and rolling elements rotatably disposed between the outer ring raceway and the inner ring raceway, and used under one of lubrication with a lubricating oil containing a fluoro-containing polymer, a grease containing a fluoro-containing polymer, and in an atmosphere containing a gas comprising fluorides, wherein the bearing comprises ball bearings with a contact angle from 10° to 45°, wherein the raceway surface roughness of the outer ring and the inner ring is 0.05 μm Ra or less and the ratio of the raceway surface roughness of the outer ring or the inner ring relative to the surface roughness of the rolling element is 6 or less.

2. The rolling bearing as defined in claim 1, wherein the contact angle is from 15° to 30°.

3. The rolling bearing as defined in claim 1 or 2, wherein at least the rolling element is formed of an alloy steel with a Cr content of 7% by weight or more and 27% by weight or less, and fine carbides are uniformly dispersed on the surface.

4. The rolling bearing as defined in claim 1 or 2, wherein at least the rolling element comprises oxide ceramics or has a dense nitride layer on the surface of the rolling element and the rolling surface roughness of the rolling element is 0.005 μm Ra or less and the rolling surface hardness is Hv 900 or more.

5. The rolling bearing as defined in claim 1 or 2, wherein particles with a mean diameter in excess of 3 μm are not present at least on the raceway surface of the outer ring and the inner ring.

6. The rolling bearing as defined in claim 1 or 2, wherein a hard layer having a hardness higher than that of the raceway surface of the outer ring and the inner ring is coated at least to the rolling surface of the rolling element.

7. The rolling bearing as defined in claim 3, wherein at least the rolling element has a dense nitride layer on the surface of the rolling element and the rolling surface roughness of the rolling element is 0.005 μm Ra or less and the rolling surface hardness is Hv 900 or more.

8. A rolling bearing comprising an outer ring having an outer ring raceway, an inner ring having an inner ring raceway, and rolling elements rotatably disposed between the outer ring raceway and the inner ring raceway, and a cage for evenly distributing the rolling elements in the rotational direction of the rolling elements between the outer ring raceway and the inner ring raceway, and used under one of lubrication with a lubricating oil, a grease containing a fluoro-containing polymer, and in an atmosphere containing a gas comprising fluorides, wherein the cage is formed with an advanced resin material into a circular shape, and having a plurality of pockets each containing the rolling element through an opening and rotatably holding the same are disposed at a predetermined distance in the circumferential direction, the size for the opening of one pocket having a weld line has a value of 93% or more of the diameter of the rolling element, and the size for the opening of at least two other pockets is 80% or more and 93% or less of the diameter of the rolling element.

9. A rolling bearing comprising an outer ring having an outer ring raceway, an inner ring having an inner ring raceway and rolling elements rotatably disposed between the outer ring raceway, and the inner ring raceway, and a cage for evenly distributing the rolling elements in the rotational direction of the rolling elements between the outer ring raceway and the inner ring raceway, and used under one of lubrication with a lubricating oil, a grease containing a fluoro-containing polymer and in an atmosphere containing a gas comprising fluorides, wherein the cage is formed with an advanced resin material into a circular shape and having a plurality of pockets each containing the rolling element through an opening and rotatably holding the same are disposed at a predetermined distance in the circumferential direction, the size for the opening of one pocket having a weld line has a value of 93% or more of the diameter of the rolling element, and the size for the opening of at least two other pockets is 80% or more and 93% or less of the diameter of the rolling element and the cage is constituted with one of a PTFE resin material and a PPS resin material and constituted by applying chamfering inner and outer diametrical sides of the pockets and forming a through hole in the bottom of the pocket.

* * * * *